(12) United States Patent
Gopal et al.

(10) Patent No.: US 9,763,167 B2
(45) Date of Patent: Sep. 12, 2017

(54) CENTRALIZED GROUND-BASED ROUTE DETERMINATION AND TRAFFIC ENGINEERING FOR SOFTWARE DEFINED SATELLITE COMMUNICATIONS NETWORKS

(71) Applicant: Hughes Network Systems, LLC, Germantown, MD (US)

(72) Inventors: Rajeev Gopal, North Potomac, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 14/817,181

(22) Filed: Aug. 3, 2015

(65) Prior Publication Data
US 2016/0037434 A1    Feb. 4, 2016

Related U.S. Application Data

(60) Provisional application No. 62/032,631, filed on Aug. 3, 2014.

(51) Int. Cl.
*H04W 40/24* (2009.01)
*H04L 12/751* (2013.01)
(Continued)

(52) U.S. Cl.
CPC ........ *H04W 40/246* (2013.01); *H04B 7/1851* (2013.01); *H04L 45/02* (2013.01);
(Continued)

(58) Field of Classification Search
None
See application file for complete search history.

(56) References Cited

U.S. PATENT DOCUMENTS 5,467,345 A    11/1995    Cutler et al.
6,072,774 A *   6/2000    Natarajan ............ H04B 7/1856
                                                  370/231
(Continued)

OTHER PUBLICATIONS

USPTO, "International Search Report & Written Opinion", PCT/US2015/043508, Mar. 30, 2016.

*Primary Examiner* — Candal Elpenord
(74) *Attorney, Agent, or Firm* — Potomac Technology Law, LLC

(57) ABSTRACT

Approaches are provided for an SDSN that employs a satellite network nodes, where central L2 network nodes are controlled via a centralized Controller. Link status information is obtained regarding links of each L2 node. Global routing constraints, satellite ephemeris data, and resource allocation information are obtained. A constellation topology of the network nodes is determined based on the ephemeris data. Network routes between pairs of endpoints are determined. Each route includes links based on the link status information regarding the links, the global routing constraints, the bandwidth resources of the links and the current allocation of bandwidth resources, and/or the constellation topology. A forwarding table is generated for each network node, wherein each forwarding table includes route entries providing a next hop indicating a destination for data packets, wherein the destination is associated with a link of the respective network node that represents a link of a respective route.

16 Claims, 12 Drawing Sheets

(51) Int. Cl.
*H04B 7/185* (2006.01)
*H04W 72/04* (2009.01)
*H04W 40/02* (2009.01)
*H04L 12/721* (2013.01)

(52) U.S. Cl.
CPC ......... *H04W 40/02* (2013.01); *H04B 7/18519* (2013.01); *H04L 45/124* (2013.01); *H04W 40/248* (2013.01)

(56) References Cited

U.S. PATENT DOCUMENTS

| | | | |
|---|---|---|---|
| 6,138,012 A * | 10/2000 | Krutz | H04B 7/18534 455/272 |
| 6,550,450 B2 * | 4/2003 | Spaulding | F02B 61/02 123/406.44 |
| 6,560,450 B1 * | 5/2003 | Rosenberg | H04B 7/18584 455/316 |
| 6,609,002 B1 * | 8/2003 | Krishnamurthy | H04B 7/1856 455/12.1 |
| 6,985,959 B1 | 1/2006 | Lee | |
| 2003/0016678 A1 | 1/2003 | Maeno | |
| 2009/0154391 A1 * | 6/2009 | Wittenschlaeger | H04B 7/19 370/316 |
| 2009/0274056 A1 | 11/2009 | Meddour et al. | |
| 2012/0263042 A1 | 10/2012 | Natarajan et al. | |

* cited by examiner

CENTRALIZED GROUND-BASED ROUTE DETERMINATION AND TRAFFIC ENGINEERING FOR SOFTWARE DEFINED SATELLITE COMMUNICATIONS NETWORKS

RELATED APPLICATIONS

This application is related to and claims the benefit of priority under 35 U.S.C. §119(e) to U.S. Provisional Application Ser. No. 62/032,631 (filed Aug. 3, 2014), the entirety of which is hereby incorporated by reference herein.

BACKGROUND

Over relatively recent times, satellites have proven to be indispensable for universal communication networking in support of a variety of personal, commercial, and security applications. With key innovations including spatial reuse of spectrum with spot beams, affordable user terminals, and use of higher radio bands such as Ka-band, commercial satellite networks currently provide broadband services to enterprises, governments, educational institutions and even consumers. Digital packet processing, almost universally used in contemporary voice, data, video and business networks, facilitates flexibility, affordability, and efficiency in transporting information using common protocols. Communications satellites themselves, however, generally have stayed with traditional transponded designs involving analog signal frequency-band conversions, filtering and signal amplification, without inclusion of regenerative packet processing and routing capabilities. Digital signal and upper layer packet processing that has revolutionized ground networking components, including those belonging to communications satellite systems, has generally not influenced the communication satellite payload designs. Aside from a few notable exceptions with onboard packet processing capabilities (such as the experimental IP Router in Space (IRIS)—see, e.g., Cuevas, E., et al., "Preliminary results of a technology demonstration of the internet routing in space capability over a geostationary communications satellite," IEEE MILCOM 2010; and the current commercially deployed Hughes SPACEWAY® satellites—see, e.g., Whitefield, D. Arnold S., Gopal, R., "SPACEWAY now and in the future: on-board IP packet switching satellite communication network," IEEE MILCOM 2006), the satellite size, weight and power (SWaP) constraints, system complexity and costs, and space qualification costs have typically limited the use of powerful digital processing capabilities in satellite payloads.

The most prevalent example of packet networking is the IP-based scheme of the global Internet, which facilitates the transmission of packetized data between end hosts via multiple network IP router node hops over a vast geographical areas around the globe. The use of IP packets over the Internet via a variety of transport media such as satellite, copper, terrestrial, wireless and fiber enables high bandwidth connectivity amongst billions of hosts. Dynamic protocols allow the end hosts and applications to identify remote peers and packet data is routed over a path comprising multiple IP routing nodes. Dynamic standards-based routing protocols allow the use of appropriate shortest paths comprising these IP routers. Basic packet routing is augmented with additional Quality of Service (QoS) and traffic engineering considerations to manage packet transport characteristics comprising data rate, delay, packet loss, and jitter. Although addressing and routing protocols (such as Domain Name System (DNS), Dynamic Host Configuration Protocol (DHCP), Open Shortest Path First (OSPF), Border Gateway Protocol (BGP)) are widely deployed to support best-effort transport, additional features for better defined and more predictable packet transport are selectively offered only as premium service (using protocols such as Multiprotocol Label Switching (MPLS), Multiprotocol-Border Gateway Protocol (MP-BGP), Resource Reservation Protocol—Traffic Engineering (RSVP-TE), Third Generation Partnership Program—Long Term Evolution (3GPP LTE) and Differentiated Services Code Point (DSCP)).

With overprovisioning, even a best-effort approach provides adequate wired network transport performance for most applications within enterprises and even over the public Internet. For high priority applications or when link and node resources are constrained, a more disciplined and expanded use of advanced traffic engineering and packet processing protocols is warranted which results in additional functions to be hosted by the network nodes. Besides higher layer packet processing, satellite networks also require suitable radio links, involving coding, modulation, and Media Access Control (MAC) functions to operate with shared radio resources (frequency spectrum and power). For high capacity nodes, physical layer functions such as coding and modulation require hardware implementation, using performance field programmable gate arrays (FPGAs) or application specific integrated circuits (ASICs). Higher layer packet processing functions such as header and payload compression, encryption, segmentation and assembly, and packet processing (such as classification, policing, queuing, scheduling) in the user data plane also warrant hardware implementation.

Further, the upper layer control plane functions, such as MAC, channel management, mobility management, and Layer 3 (L3) control functions, for addressing, routing, QoS, and traffic engineering require significant software solutions. Software is needed to support complex two or multi-party protocol implementations and to continue to accommodate changes for correcting design errors and addressing security vulnerabilities, and to add new features associated with design enhancements and protocol evolution. Such software solutions are generally addressed via standardize protocols, administered by standards setting organizations such as the European Telecommunications Standards Institute (ETSI) and the Telecommunications Industry Association (TIA). The standards working group for such upper layer software solutions are typically dominated by terrestrial network service and equipment providers, and thus do not necessarily address satellite-specific constraints and performance objectives (such as larger satellite propagation delay, movement of near-Earth orbit satellites relative to fixed user terminals, longer satellite lifetime, etc.), which can make satellite-based implementation even more problematic.

Satellite and aerial networks are hosted by platforms with limited size, weight and power (SWaP) constraints, and require efficiencies in radio and digital processing resource use at physical, link and network layers. User data packetization helps improve efficiency, but also imposes further requirements for digital processing in the respective networking nodes. Further, in addition to the SWaP constraints that satellite and other aerial platforms are subject to, unlike terrestrial networks where nodes can be routinely upgraded with new hardware, satellites are also subject to high deployment costs and are generally not upgradeable once deployed—thus each and every function and requirement must be carefully analyzed and designed with as much expansion and upgrade potential for the initial satellite design, and the associated hardware and software must be extensively tested throughout the design and production process and during an extensive post-production and pre-launch period. In recent years, however, with the rapid development of satellite technology, including on-board processing or on-board packet switching and inter-satellite communications links, satellite and other airborne network devices (such as satellite or space Internet Protocol (IP) routers and airborne high altitude platform (HAP) routers) have become viable options for commercial networks. Further, the successful launch and commercial operation of the Hughes SPACEWAY® satellites, employing Ka-band spot beam antennas and onboard packet processing and switching, has helped validate the technical merits of onboard digital processing, which enables efficiencies and new services (such as point-to-point single-hop mesh connectivity).

In order to address the complexities encountered with large, broad-based private networks, what is needed are approaches for a private software defined satellite network (SDSN) that employs a constellation of airborne network nodes, where all main or central Layer 2 (L2) network nodes are controlled via a centralized System Controller (SC).

SUMMARY

The present invention advantageously addresses the needs above, as well as other needs, by providing approaches (according to example embodiments) for a private software defined satellite network (SDSN) that employs a constellation of airborne network nodes, where all main or central Layer 2 (L2) network nodes are controlled via a centralized System Controller (SC). Such airborne network nodes may be deployed via any of a multitude of airborne platforms, such as satellite platforms (including geostationary earth orbit (GEO) satellites, medium earth orbit (MEO) satellites and/or low earth orbit (LEO) satellites), high altitude platforms (HAPs), aircraft, etc. According to such embodiments, the SDSN decouples data plane functions from control plane functions, and employs a logically centralized System Controller that utilizes overall network state knowledge and decision making to facilitate optimal resource allocations for dynamic packet processing and transmission. By way of example, an SDSN network node uses Forwarding Tables configured by a centralized System Controller to govern packet routing within embedded L2 switches without requiring elaborate Layer 3 control plane software implementation in every network routing node. In addition to upper layer packet queuing and switching, the SDSN further employs dynamic radio transmission links utilizing associated modulation, coding and resource allocation functions for dynamic link control.

According to such embodiments, SDSN architectural concepts can be deployed with a satellite system that employs one or more satellites that include packet processing switches. The onboard switching function, for example, may be implemented via a payload packet processor and switch that routes packets based on routing tables determined and maintained by a logically centralized ground-based System Controller, with centralized support for addressing, routing and packet flow management. Further, the SDSN network architecture and performance can be expanded to include direct data packet forwarding/routing from satellite to satellite via inter-satellite links and enhanced routing and resource management functions at the System Controller. In addition to satellite platforms, the SDSN architecture and functionality for addressing, routing, QoS, traffic engineering and resource management can also be utilized for other airborne network nodes via aerial and high altitude networking platforms. Accordingly, the present SDSN approaches facilitate the implementation of communications systems that leverage the benefits of packet routing via satellite and other airborne network nodes, without requiring such nodes to include significantly enhanced processing hardware and complex control plane software for route determination and traffic engineering operations.

Embodiments of the present invention provide for an improved and enhanced SDSN approach based on a regenerative/switching spot-beam payload architecture, with additional embodiments providing for additional improvements and enhancements based on payload design concepts that include inter-satellite links. With multiple space-borne paths available with a better-connected networking fabric, the benefits of packetization are easier to trade for additional L2 switching implementation complexity. Moreover, as would be apparent to one of skill in the art, in addition to GEO satellites, the SDSN concepts of such example embodiments can be applied to additional air/space-borne platforms, such as LEO satellites, MEO satellites, high altitude long endurance (HALE) platforms and high altitude platforms (HAP), which, in accordance with further embodiments, may support inter-node links (links between different air/space-borne platforms).

The SDSN approach of embodiments of the present invention enables lower cost and lower risk satellite packet switching nodes, which can be orchestrated by ground-based System Controller (the System Controller), to provide networking services for various applications and users. A simplified use of terrestrial distributed routing does not scale for satellite networks which have a very large fan-in and fan-out connectivity per satellite node. Besides route determination a satellite the System Controller can also perform on-demand uplink and/or downlink resource management for links with variable data rates. Such SDSN embodiments thus enable a unified architecture where onboard nodes provide fast L2 data forwarding, while the packet and link-level control plane decision making is delegated to a separate ground the System Controller (with access to scalable computing resources for optimal decision making). The System Controller may also grant packet and packet-flow level radio link resources considering terminal and application priority using the same resource pools which are used for dynamic route determination for better overall service assurance.

The SDSN approach of embodiments of the present invention (and its simplified implementation on satellites) addresses certain key limitations of terrestrial distributed routing which are listed as follows: inefficiency of distributing link states based on flooding; suboptimal single objective route determination because of CPU limitations on distributed nodes; suboptimal routes because of lack of service-level information including aggregate resource allocations; and high cybersecurity vulnerabilities associated with distributed route calculations. Such SDSN embodiments thus provides for a simpler satellite payload design, maximizing the processing resources for data plane packet forwarding in satellites instead of performing redundant, suboptimal and inefficient route calculation in each node.

The SDSN approach of embodiments of the present invention provides for granular programmability without requiring complex control plane implementation in each satellite node. With rapid advances in digital processing qualified for satellites, it is now possible to introduce commoditized high capacity space functions for basic packet processing. Accordingly, the SDSN approach of embodiments of the present invention can employ simplified network hardware in the satellite, while maintaining flexibility and continued control plane improvements in ground-based the System Controller software. Further, with the SDSN approach of embodiments of the present invention, a collection of such low cost and low risk network nodes can be managed by the System Controller, facilitating a full spectrum of networking services in support of various applications, organizations and users. The SDSN network nodes can be hosted by LEO, MEO and GEO satellites, and also high altitude and airborne platforms, that are typically resource constrained and can also benefit from control plane complexity reduction. The SDSN approach of embodiments of the present invention also supports mesh connectivity for communications systems employing LEO, MEO and GEO satellites, and HALE or HAP, which employ a processing Layer 2 switch with multiple uplink and downlink spot beams and optional inter-satellite links.

In accordance with example embodiments, a method for a private software defined satellite network (SDSN), wherein the central Layer 2 (L2) network nodes are controlled via a centralized System Controller (SC), is provided. Link status information regarding one or more links of each of a plurality network nodes of a communications network is obtained, wherein each link is between two of the network nodes. Global routing constraints are obtained from a network operations center. Satellite ephemeris data regarding each of one or more satellite nodes of the communications network is obtained. Resource allocation information regarding network bandwidth resources of the links, and a current allocation of the network bandwidth resources to each of the links, are obtained. A constellation topology of the plurality of network nodes is determined based at least in part on the satellite ephemeris data. A plurality of network path routes between various pairs of endpoints of the communications network are determined, wherein each path route includes one or more of the links, and wherein each path route is based at least in part on one or more of the link status information regarding the respective links of the path route, the global routing constraints, the network bandwidth resources of the links and the current allocation of the network bandwidth resources to each of the links, and the network node constellation topology. A forwarding table is generated for each of the network nodes, wherein each forwarding table includes a plurality of route entries, wherein each route entry provides a network node next hop indicating a next hop destination for respective data packets, wherein the next hop destination is associated with a one of the links of the respective network node that represents a one of the links of a respective one of the network path routes. The forwarding table is updated at periodic intervals over a predetermined period of time based on actual link status information collected from the network. Route aggregation may be performed to reduce the size of the forwarding table, which collapses multiple entries with the same next hop that can share a common label prefix. Each forwarding table is provided to the respective network node.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
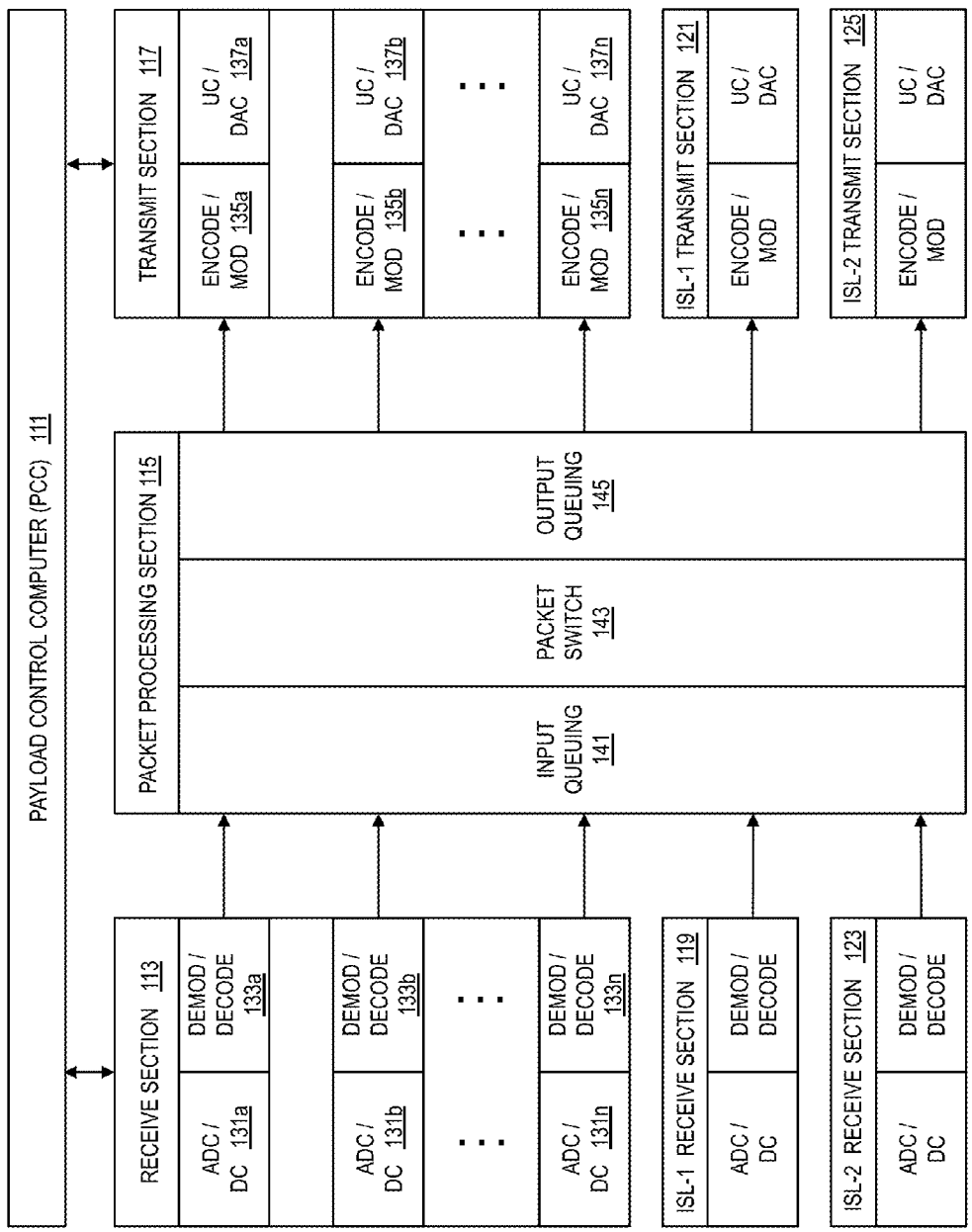
FIG. 1 illustrates a block diagram depicting the software defined network data packet processing of a regenerative communications satellite payload, in accordance with example embodiments of the present invention.

A system and method for a private software defined satellite network (SDSN) that employs a constellation of airborne network nodes, where all main or central Layer 2 (L2) network nodes are controlled via a centralized System Controller (SC), are described. Such a software defined satellite network (SDSN), according to example embodiments, provides for centralized management, reduced implementation complexity and improved and enhanced operational functionality. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various payload implementation options may be employed in a software defined satellite network, ranging from transponded designs with no digital capability to a regenerative satellite design. Table 1 summarizes a number of payload design options, and includes a qualitative analysis regarding system capacity and connectivity capabilities of each design option. Capacity corresponds to aggregate throughput across satellite terminals that needs to be aligned with the temporally and spatially varying user traffic. Connectivity corresponds to the single hop exchange of data between terminals. Adaptability is the inherent capability of a satellite system to "reconfigure" itself in order to maximize utilization even if user traffic has temporal or spatial variations. In order to maximize statistical multiplexing gains, the systems need to adapt to detailed variations associated with the smallest level of traffic granularity (individual user data packets). The first five satellite design options of Table 1 operate in a bent-pipe mode and can support any waveform (e.g., coding and modulation specification) for satellite terminals. The last option (with a regenerative communications payload), provides for the highest capacity, connectivity and adaptability advantages, but requires the use of a specific waveform that can be processed by the satellite—however, with the use of standards-based waveforms (e.g., ETSI/TIA DVB-S2), the requirement for use of a specific waveform does not present a significant issue.

Accordingly, physical layer coding/decoding and modulation/demodulation functions are computationally intensive and for high performance, mature waveform standards (such as DVB-S2) can now safely be implemented in application specific integrated circuits (ASICs) to reduce the satellite size, weight and power (SWaP) requirements. Further, with multiple links, the SWaP savings multiply. As an alternative to ASICs, field programmable gate array (FPGA) integrated circuits can be employed (with higher SWaP requirements compared to ASICs), whereby enhancements to packet processing functions (e.g., packet classification, queuing and scheduling techniques) can be implemented via subsequent (e.g., post-launch) FPGA programming. The decision between ASICs and FPGAs would depend on an analysis of the tradeoffs between the flexibility offered by FPGAs versus beneficial SWaP requirements of ASICs. Additionally, according to example embodiments, a general purpose computer, for lower data rate control functions (e.g., Forwarding Table updates) and management functions (e.g., fault monitoring), may be employed to leverage full flexibility of software during the life of a satellite in an SDSN.

TABLE 1

Communications Satellite Payload Options

| Payload Type | Implementation Approach | Capacity Considerations | Connectivity Considerations | Limitations |
|---|---|---|---|---|
| Single Beam Analog Transponded | Analog up-conversion, filtering, and down-conversion of signals within satellite | Proportional to assigned spectrum. Appropriate for broadcast | Terminals within the beam can mesh (single-hop) communicate | Limited two-way communication capacity Analog bent-pipe |
| Multi-Beam Analog Transponded | Multi-color reuse of spectrum (sub-bands) across beams, each using analog transponders with fixed connectivity | Capacity increase proportional to (number of beams)/(number of colors) | Across some beams which are selectively connected using fixed RF waveguides | Limited connectivity across beams, implemented at satellite design time |
| Multi-Beam Analog IF Matrix Switch | Multi-color reuse with added benefit of semi-flexible inter-beam connectivity | Limited capacity adaptability for temporally varying aggregate traffic | Beam-to-beam connectivity possible with the IF switch | Suitable for semi-static and mostly uniform aggregate traffic across beams |
| Multi-Beam Digital Channelizer (DC) | Digital sampling, beam channel (time or frequency) de-multiplexing, digital channel switching, and output channel multiplexing for beam inter-connectivity | Capacity can be better adapted with temporally varying aggregate traffic (configuration timescale - seconds) | Configurable beam-to-beam connectivity (variable data rates) for dynamic aggregate traffic | Complexity and SWaP constraints required for high rate processing of analog signals Digital bent-pipe |
| Multi-Beam Digital Channelizer Beam-Forming | Configurable location and shape of multiple beams generated with phased array antenna and (optionally) digital processing | Capacity can be better adapted with spatially varying aggregate traffic (configuration timescale - seconds) | More flexible inter-connection of beams that can be shaped and relocated at aggregate traffic level | Beam-forming phased-array antennas have high SWaP, complexity and cost |
| Multi-Beam Digital Regenerative Payload | Regeneration of data packets in satellite payload with demodulation, decoding, packet switching followed by modulation and coding prior to retransmission on a specific beam | Significant adaptation of capacity with varying traffic at fine granularity (statistical multiplexing gain is high because of packetization) | Packet level switching across beams at packet level timescales (micro-seconds) | Implementation complexity and slightly higher SWaP for switch. Packet-level adaptability does not necessarily need complex beam-forming |

FIG. 1 illustrates a block diagram depicting the software defined network data packet processing of a regenerative communications satellite payload, in accordance with example embodiments of the present invention. By way of example, a satellite node of the SDSN can be realized by employing regenerative communications payloads, which employ digital processing for demodulation, decoding, packet switching and dynamic link management, in a multi-beam satellite. A regenerative satellite payload, as summarized by the last design option of Table 1, provides for regeneration of data packets in the satellite payload with demodulation, decoding and packet switching, followed by modulation and coding prior to retransmission on a specific beam (e.g., in the case of a multi-beam or spot beam satellite). Such a payload architecture facilitates various advantages in a software defined satellite network of example embodiments of the present invention, including (1) flexible and dynamic capacity adaptation with varying traffic at fine granularity (e.g., statistical multiplexing gain is high based on the packetization), (2) packet level switching across beams at packet level timescales (e.g., micro-seconds). For a SDSN of example embodiments of the present invention, the regenerative payload design option provides for advantageous capacity, connectivity and capacity adaptability characteristics. Accordingly, the regenerative payload design architecture is employed for the subsequent description of example embodiments of the present invention.

With reference to FIG. 1, such a regenerative satellite payload comprises functional sections, including a payload control computer (PCC) 111, a receive section 113, a packet processing section 115, and a transmit section 117. Additionally, when the satellite network node includes inter-satellite links (ISLs), the regenerative payload will also include and ISL receive and transmit section for each inter-satellite link. As shown in FIG. 1, the satellite includes two inter-satellite links, ISL-1 and ISL-2, whereby the payload includes the ISL-1 receive section 119, the ISL-1 transmit section 121, the ISL-2 receives section 123 and the ISL-2 transmit section 125. For each receive antenna feed, the receive section includes an analog to digital converter (ADC), down-converter (DC), demodulator (DEMOD) and decoder (DECODER)—as depicted in FIG. 1, the ADC/DC 131*a* and DEMOD/DECODER 133*a*, the ADC/DC 131*b* and DEMOD/DECODER 133*b* and the ADC/DC 131*n*, and DEMOD/DECODER 133*n*. Similarly, for each transmit antenna feed, the transmit section includes an encoder (ENCODER), modulator (MOD), up-converter (UC) and digital to analog converter (DAC)—as depicted in FIG. 1, the ENCODER/MOD 135*a* and the UC/DAC 137*a*, the ENCODER/MOD 135*b* and the UC/DAC 137*b*, and the ENCODER/MOD 135*n* and the UC/DAC 137*n*. The ADC/

DC translates and down-converts analog signals received by the respective receive antenna feed to generate a respective digital signal waveform. The packet processing section 115 includes a packet processor 147 that is configured to perform overall processing of the received packets and control of the input queuing section 141, the packet switch 143, and the output queuing section 145.

Analog carrier signals are received by each of the receive antenna feeds, and are fed into the respective receive section. The receive section filters and down-converts the respective carrier signal, and the demodulator demodulates the received signal waveforms to obtain the bit sequences of the transmitted encoded signals. The decoder then decodes the de-interleaved bit sequence to generate the originally transmitted data packets (also, in the case where the transmitted bit sequences were also interleaved as part of the encoding, the decoder will deinterleave the bit sequences before decoding). The decoded packets are passed by each receive subsection (associated with the respective receive antenna feeds), to the packet processing section 115. The input queuing section 141 queues the packets from the respective receive subsections for processing and forwarding via the packet switch 143. The packet processor 147 de-encapsulates each of the decoded packets to determine certain factors relevant to the requisite destination routing for the packet. By way of example, such factors include quality of service (QoS) or data traffic type, source address, destination address, and next top information. Based on the determined factors, the packet processor then re-encapsulates each packet for transmission to the next hop network node, and forwards the packet through the packet switch 143 to the appropriate output queue for the intended next hop network node. Each of the transmit subsections (associated with a respective transmit antenna element) will be associated with one or more of the output queues within the output queuing section 145. For example, the output queuing section 145 may include different priority queues for the packets destined for the respective transmit subsection, and the packet processor 147 would forward packets from the respective queues associated with the transmit subsection based on priority and associated timing to ensure an appropriate bandwidth and quality of service is maintained for the respective queue. In that manner, the packets are fed to the respective transmit subsections, where they are encoded and modulated via the respective encoder/modulator pair, and digital to analog converted and up-converted via the respective UC/DAC pair, for transmission via the respective transmit antenna element. Additionally, with respect to the inter-satellite links, analog carrier signals are received by the ISL subsections, processed to generate the originally transmitted data packets, and passed on to the packet processing section 115 preprocessing in the same manner as the analog carrier signals received by the receive section 113. Accordingly, the regenerative satellite payload is configured to receive packets via the various satellite receive links, process the packets, and route the packets to respective next hop network nodes via the various satellite transmit links.

A regenerative payload can offer sufficient flexibility for the various networking features so that parametric adjustments can adapt individual functional behavior and resource usage as the traffic and external environment conditions change temporally and spatially. Table 2 summarizes networking features that cumulatively enable adaptability in regenerative payloads for implementation of an SDSN satellite node with adjustable behavior management (controlled by the System Controller), which can leverage global system/network state information and scalable decision making capability.

TABLE 2

Primary adaptable networking features required for SDSN implementation with regenerative satellite payloads

| Networking Feature | Time Scale | Adaptability Considerations | SDSN Implementation Considerations |
|---|---|---|---|
| Efficient Uplink and Downlink | Microseconds | Adaptable modes for changing external conditions and various terminal types | Significant digital processing for decoding of efficient FEC codes (such as Low Density Parity Code) requiring hardware (ASIC) implementation |
| Fast Packet Switching | Microseconds | Fundamental feature to enable packetization for traffic adaptability | Switch itself can be simplified to enable FPGA implementation (in-orbit re-programmability) |
| Packet Queuing, Policing and Scheduling | Microseconds | Critical function to balance packet level prioritization and fairness | High capacity hardware (FPGA or ASIC implementation) to deal with high data rate packet processing functions |
| Dynamic Route Determination | Seconds to Minutes | Accommodation of changes in traffic, link states, resource allocations to maximize utilization and deal with link impairments | Compute intensive ground-based software implementation especially for high-frequency multi-objective optimizations (e.g., multiple QoS considerations such as data rate, packet loss and delay) for large networks |
| Packet Flow Admission Control | Seconds | Configurable reservation, precedence consideration, and preemption at packet flow level | Software based ground implementation with online organization-level resource pool databases to track aggregate capacity allocations and terminal/application level connections for individual packet flows |
| Dynamic Power Control | Milliseconds | First line of defense for environmental attenuation (e.g., rain, interference) | Software implementation with decision making using SNR measurements or external |

TABLE 2-continued

Primary adaptable networking features required for SDSN implementation with regenerative satellite payloads

| Networking Feature | Time Scale | Adaptability Considerations | SDSN Implementation Considerations |
| --- | --- | --- | --- |
| Adaptive Coding and Modulation | Milliseconds | Selection of suitable mode (coding, modulation) to best deal with signal attenuation | weather sources for software implementation Decision making loop similar to power control but requires more sophisticated software with hysteresis and finely-tuned transition trajectory across multiple modes |
| Dynamic Resource Allocation | Milliseconds | Balancing of fairness and prioritization for various types of packet flow (volume and rate) level traffic | Real-time software implementation with specific optimization objectives for large number of terminals and fine resource allocation granularity (packet level time and frequency slots). Ground implementation preferred for optimized decision making. |

Figure 2A:
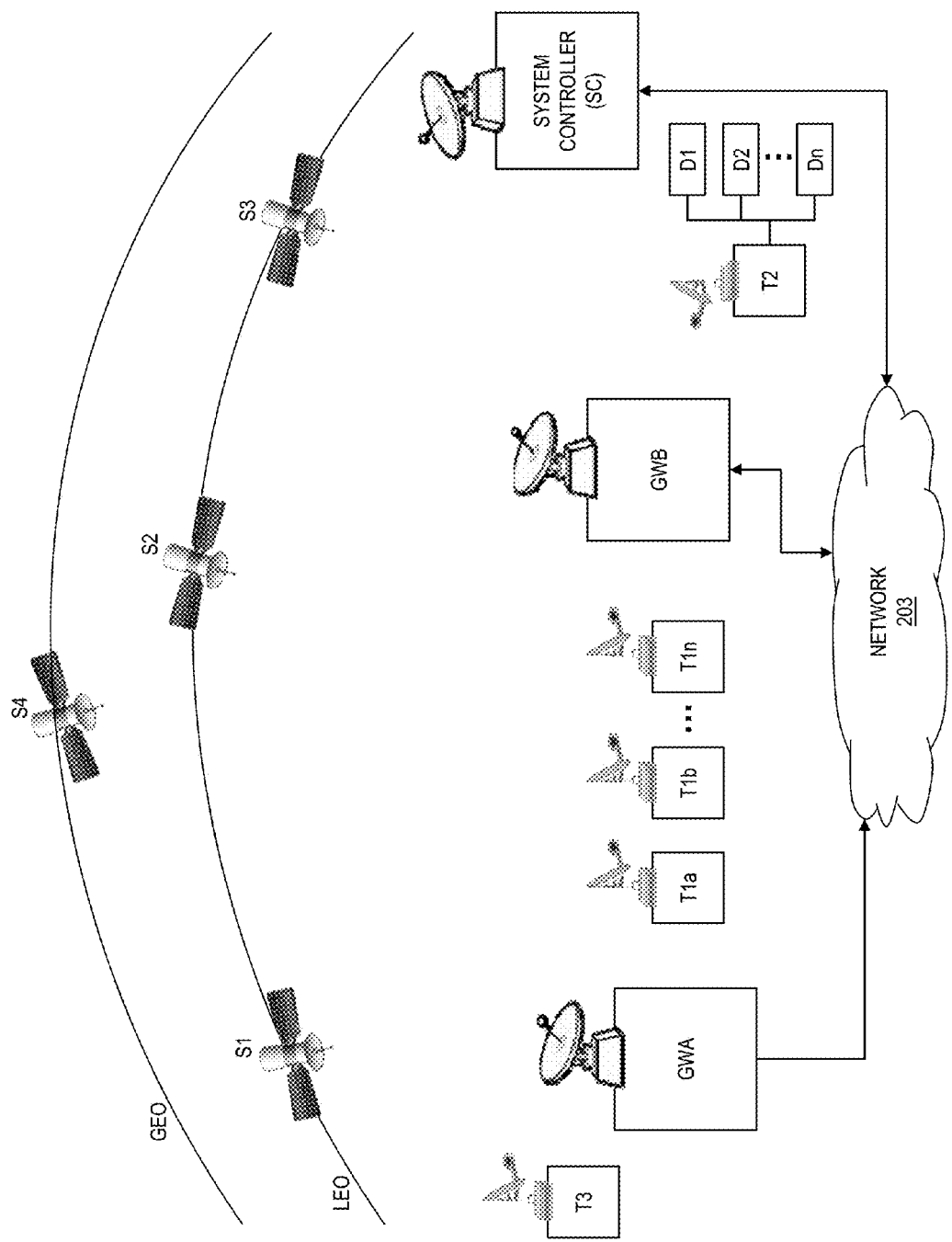
FIG. 2A illustrates a diagram of a private software defined satellite network (SDSN) employing a logically centralized System Controller, in accordance with example embodiments of the present invention.

FIG. 2A illustrates a diagram of a private software defined satellite network (SDSN) employing a logically centralized System Controller, in accordance with example embodiments of the present invention. With reference to FIG. 2A, the SDSN includes a number of satellites (e.g., S1, S2, S3), a Gateway (GWA), a Gateway (GWB), a number of consumer terminals (T1a, T1b, . . . , T1n), a main corporate office enterprise terminal (T2), a remote office terminal (T3) of the same enterprise as the terminal T2, and the System Controller (SC). The enterprise terminal is connected to a number of user devices (D1, D2, . . . , Dn) via a LAN 201. The gateways GWA and GWB, and the System Controller SC, connected to a global network 203 (e.g., the Internet). As would be appreciated by one of skill in the art, the SC in the gateways GWA and GWB may communicate over the network 203 via many different methods, such as a virtual private network (VPN), a dedicated wide area network (WAN), or the like. Further, the constellation of satellites S1, S2, S3 may comprise any combination of LEO, MEO, GEO satellites, and other airborne platforms (e.g., high-altitude platforms (HAPs) or other aircraft platforms), which may scale upwards to multiple additional satellites and/or other airborne platforms. As would also be appreciated by one of skill in the art, such a network may scale to larger sizes to include multiple enterprises, multiple communications service providers (such as Internet service providers (ISPs), each potentially with a multitude of its own respective customers), backhaul enterprise customers (such as backhaul links for providing backhaul services to 3G or 4G cellular network providers, hundreds or even thousands of direct small-scale customers (such as consumer Internet customers and small-office/home-office (SOHO) customers), etc. Additionally, these various terminals and gateways may be dispersed over a large geographic area within a given country or even spanning the globe across multiple countries. Accordingly, the SDSN must be configured to support potentially thousands of user terminals along with multiple gateway terminals dispersed throughout many facilities spread across vast geographical areas, where the data communications transmitted across the network comprise multiple different data traffic and priority classes associated with a wide variety of end-user applications (where the priorities of any given traffic class may vary depending on the source of specific packets—e.g., depending on the particular service level agreements (SLAs) of the enterprise customer from where the packets originated).

In accordance with example embodiments, the SDSN may be configured to address data traffic from two perspectives. One such perspective being from the standpoint of the SLAs guaranteed to the respective enterprise customers—including SLAs at various different levels down to the particular terminal of an enterprise from where packets originate (e.g., different terminals of a given enterprise may warrant differing levels of quality of service based on the importance to the enterprise of the data traffic to and from a given terminal, such as a point-of-sale terminal or large-scale corporate headquarters terminal). As another perspective, with respect to smaller individual (e.g., consumer Internet) and SOHO customers, network traffic must be addressed at an aggregation level. More specifically, the universe of such smaller individual and SOHO customers potentially generate a high level of data traffic on an aggregate level, and thus the network must be configured to support a certain quality of service level for that traffic in order to maintain respective customer satisfaction.

With further reference to FIG. 2A, a data routing example may entail a data transmission from the remote office terminal T3 (e.g., in London) to the corporate headquarters terminal T2 (e.g., in California). Such a data transmission may take a number of different paths. For example, the transmission may take a short path via the satellite S1 to the Gateway GWA, and then from the Gateway GWA (via the same satellite) to the terminal T2. At the time, however, suppose that the satellite S1 is unable to reach the terminal T2 and the satellite S2 can—where, in that case the routing decision would have to be made by the satellite S1 to forward the data packets via an ISL to the satellite S2 for transmission to the terminal T2. Additionally, network conditions may render certain paths less desirable and others in the context of meeting required SLAs for the data traffic—where, in that case further routing decisions must be made by respective network nodes to take into consideration such network link conditions. Typically, however, such routing decisions are made based on protocols such as shortest path routing whereby the required SLAs may not be met depending on network link conditions. Also, if a large number of terminals of a given region (e.g., terminals T1a, T1b, . . . , T1n) are sending data via a shortest path route to a respective gateway (e.g., Gateway GWA), the respective links of that route may become saturated resulting in a degraded quality of service for the terminals, and also may result in inability to satisfy required SLAs for enterprise data traffic being carried via a route including the saturated links.

In accordance with example embodiments, therefore, the System Controller (SC) centrally monitors network conditions between all the routing nodes of the network, and provides routing information to each of the nodes to ensure that the network traffic satisfies all respective transmission requirements. According to one such embodiment, each of the network nodes periodically reports traffic and link conditions for each of its potential transmission links to other network nodes. For example, if the satellite S1 has a current ISL with the satellite S2, and also has uplink and downlink channels to the gateways GWA and GWB, will periodically report the traffic and other conditions (e.g., achievable throughput which may vary depending on such factors as weather conditions) for each of those links to the System Controller. Further, with respect to inter-satellite links, any given satellite may be configured with one or two, and upwards of four or more, ISL transceivers, whereby the satellite may communicate with other satellites within its orbital plane, or even with satellites and other airborne platforms of other orbital planes (e.g., the satellites S1, S2, S3 may be LEO satellites that can communicate via respective ISLs with the GEO satellite S4). While a satellite may be configured with multiple inter-satellite links, however, at any given time the satellite may only be in range with one other satellite, or perhaps no other satellites may be in range, and even when in range the ISL may be degraded based on other conditions. Further, in the case of LEO satellites, for example, based on the movement of the satellite through its orbit, at any given time the satellite will be in range of different satellites and different gateways depending on its then current orbital position.

Accordingly, in one embodiment, the satellite would report its link conditions to the System Controller at an appropriate time interval in view of the expected frequency or timing of significant link condition changes (e.g., a LEO satellite may be configured report link conditions to the SC at a higher frequency than a GEO satellite). Alternatively, considering that such airborne platforms are controlled and flown in a particular orbital pattern (e.g., a LEO travels through its orbit at a known rate of speed, and a HAP would typically be flown in a given circular, oval or figure eight orbit), the System Controller may be programmed with the required information of the orbit of each airborne network node to be able to determine the location of each such airborne node at any given point in time. Further, based on such management and control of the satellites, the System Controller would have system knowledge of the programmed/controlled management of each of its links (e.g., whether at any given time, one or more of the ISLs of a given satellite has been shut down by the management control). In such a case, each airborne network node may still periodically report link conditions to the System Controller, whereby the System Controller may use that information to confirm orbital positions and other managed link conditions when making routing determinations for the respective node. Also, the System Controller would need such reports in the case that, regardless of the position of an airborne network node, a particular link of that node may be malfunctioning (information that the SC could not determine simply based on the known position of the airborne node).

According to such embodiments, therefore, at any given point in time, the System Controller will have knowledge of the overall network topology, and available routes between the various network nodes. Within that overall network topology, the System Controller will also have knowledge of the link conditions between the network nodes. Further, also within that network topology the System Controller may be programmed with knowledge of the distribution/location of various customers and customer sites, and of the particular customer sites and types of data traffic being serviced by a given network node. Based on that knowledge of the distribution of each customers sites within the network, the System Controller can be programmed to apply the various SLAs of a given enterprise customer on a site-by-site basis in making route determinations for the different data types of that enterprise customer. For example, with reference again to FIG. 2A, where the terminal T2 represents a corporate site and the terminal T3 represents a remote site of a given enterprise customer, the System Controller would apply any required bandwidth levels when making route determinations for packets with either a source or destination address of T2 or T3 in order to satisfy the respective SLAs of that enterprise for its sites T2 and T3. According to further embodiments, in addition to the reported information regarding link status and traffic conditions for each link of a network node, each network node may also report actual measured data usage of its respective links, which can be broken down on various granularity levels. For example, in network node may report aggregate traffic bandwidth over a given link at a respective time or time period, or may break that measured traffic information down on the basis of source/destination addresses to provide an estimate of the bandwidth usage over that link on a customer basis. Based on such information regarding measured data usage of the respective links, for example, where a particular customer is only using a fraction of the potential bandwidth guaranteed to that customer based on an SLA, the System Controller may update its route determinations to apportion the unused bandwidth for other data traffic over the respective links. Then, should that customers data usage ramp up towards the bandwidth guaranteed by the respective SLA, the System Controller would update its route determinations to reapportion that bandwidth back to the customer. Such operations, however, would depend on the exact terms of the respective SLA (e.g., whether the SLA was for an absolute guaranteed bandwidth, or whether the SLA bandwidth was preemptable).

In order to implement the routing determinations of the System Controller, in accordance with example embodiments, the System Controller generates a routing or forwarding table for each network node. By way of example, for a given network node, this routing table would provide a table of next network node hop destinations for each of a multitude of potential network data packets transmitted to that node. More specifically, the table would include a listing of potential packets designated by a traffic type or quality of service (QoS) requirement, a source address, a destination address, and a next network node hop. Accordingly, for each packet received by the network node, node determines its traffic type or QoS, its source address and its destination address, and determines the next network node hop for that packet based on the respective entry in the forwarding table for that QoS, source address and destination address. In that regard, the traffic type or QoS indicates a priority level for the packet, and the source and destination addresses indicate a particular customer and customer site/terminal from where the packet originated and two where the packet is being transmitted. Accordingly, the System Controller designs the respective forwarding table for each network node, based on its knowledge of the overall network topology and link conditions, to ensure that all routes amongst the network nodes support the required data traffic loads and throughput on a customer-level basis. Further, as network topology and link conditions change, the System Controller continually updates routing/forwarding tables and periodically provides the updated tables to the respective network nodes.

As an example, assume that a particular enterprise customer SLA guarantees that customer 50 Mbps of bandwidth for voice over IP (VOIP) data traffic between its terminal site T2 and its terminal site T3, the System Controller will determine an available route/path between the terminal sites T2 and T3 that supports the required 50 Mbps, and provide route entries in the forwarding tables for each of the network nodes along that path to ensure that the customers data follows the determined path between the terminal sites T2 and T3. For example, at one point, the System Controller may determine that the path from the terminal site T3 to/from the Gateway GWA via the satellite S1, and then to/from the Gateway GWA to the terminal site T2 via the satellite S2, satisfies the required 50 Mbps SLA. Accordingly, for VoIP data traffic with source address of T3 and a destination address of T2, the System Controller would include (i) an entry in the forwarding table for the satellite S1 whereby the next hop is the Gateway GWA, (ii) an entry in the forwarding table for the Gateway GWA whereby the next hop is the satellite S2, and (iii) an entry in the forwarding table for the satellite S2 whereby the next hop is the terminal site T2. Similarly, for VoIP data traffic between the terminal sites T2 and T3 in the opposite direction, the System Controller would also include entries in the forwarding tables for the network nodes S2, GWA and S1 to cover that direction.

Further, at a subsequent time, assume that the link between the satellite S1 and the Gateway GWA becomes congested to the point where it can no longer support the required 50 Mbps (e.g., is during a peak time when the consumer terminals T1a, T1b, . . . , T1n are active and the node GWA services the Internet access for those terminals). At this point, the node GWA and/or the node S1 will report this traffic congestion to the System Controller. The System Controller would then determine an alternate route for the VoIP traffic between the customer sites T2 and T3 that supports the required 50 Mbps. For example, instead of using the link from the node S1 to the node GWA, the System Controller may determine that an ISL link is available from the satellite node S1 to the satellite node S2. Accordingly, for the VoIP traffic between the terminal sites T2 and T3, the System Controller would update the forwarding table for each of the nodes S1 and S2 so that they directly route such data via the ISL link between them. According to a further embodiment, in the event that the System Controller cannot determine any path or route at a given point in time that is capable of supporting the required 50 Mbps SLA, the SC may divide the traffic into two 25 Mbps routes. For example, the SC may update the respective network node forwarding tables to provide a 25 Mbps route/path from the terminal site T3 to/from the Gateway GWA via the satellite S1, and then to/from the Gateway GWA to the terminal site T2 via the satellite S2, and another 25 Mbps route/path from the terminal site T3 to the satellite S1, from the satellite S1 to the satellite S2 via the respective ISL, and from the satellite S2 to the terminal site T2.

In accordance with further example embodiments, in addition to the route determination function (RDF) performed by the System Controller for generating the routing or forwarding tables for the respective network nodes, the SC for the performs a resource management or planning function (RPF). As part of the RPF, the SC obtains capacity information from NOC databases, such as resource capacity information and resource capacity allocation information. Then, based on the obtained capacity information, as part of a particular route determination for a path between two endpoint nodes (e.g., to meet an applicable SLA requirement of a particular customer), the SC performs capacity analysis for each of the links to determine that each link of the routing path has sufficient capacity to support the applicable SLA requirement. More specifically, with respect to a specific link being considered as a potential link for the route determination, the SC determines the available capacity for that link. For example, based on the capacity information obtained from the NOC database, the SC determines the available capacity of the link as the total capacity of that link minus the already allocated capacity of that link. In accordance with such embodiments, this RPF function of the System Controller provides yet another level of granularity for ensuring that the forwarding tables of each network node provide route information for a path beteen two endpoints that will support all network requirements (e.g., customer SLAs, global system routing constraints, etc.). Further, such routing determinations taking into account capacity planning are not currently performed in terrestrial networks, because such networks employee significantly wideband communication links that do not require such tight resource planning (as opposed to resource planner required for satellite capacity). Further, such routing determinations are not performed in systems that employee distributed routing determination functions (where the network nodes themselves do the route determinations), because the network nodes themselves do not possess such information regarding the overall resource capacity and allocations of the network. By way of example, given a particular SLA requirement for a path between two endpoints (e.g. a particular SLA for packet indications between to sites of an enterprise customer, such as a 50 Mbps packet throughput requirement), the System Controller will first eliminate all links where the available capacity is less than the required 50 Mbps. Then, once the SC determines a desired route for the path (and includes that route in the respective individual node Forwarding Tables), where all links are able to meet the required 50 Mbps, the SC then updates the database (or informs the NOC to update the database) to indicate that the 50 Mbps is now an additional current allocation of the respective links. Further, in the event that the SC is unable to find a complete path of links, where each think supports the required 50 Mbps, as discussed above, the SC can divide the SLA requirement of 50 Mbps into two separate 25 Mbps SLA requirements between the two endpoints. In that case, the SC will determine two different route paths between the two endpoints, where each route path will support subdivided SLA of 25 Mbps.

Figure 2B:
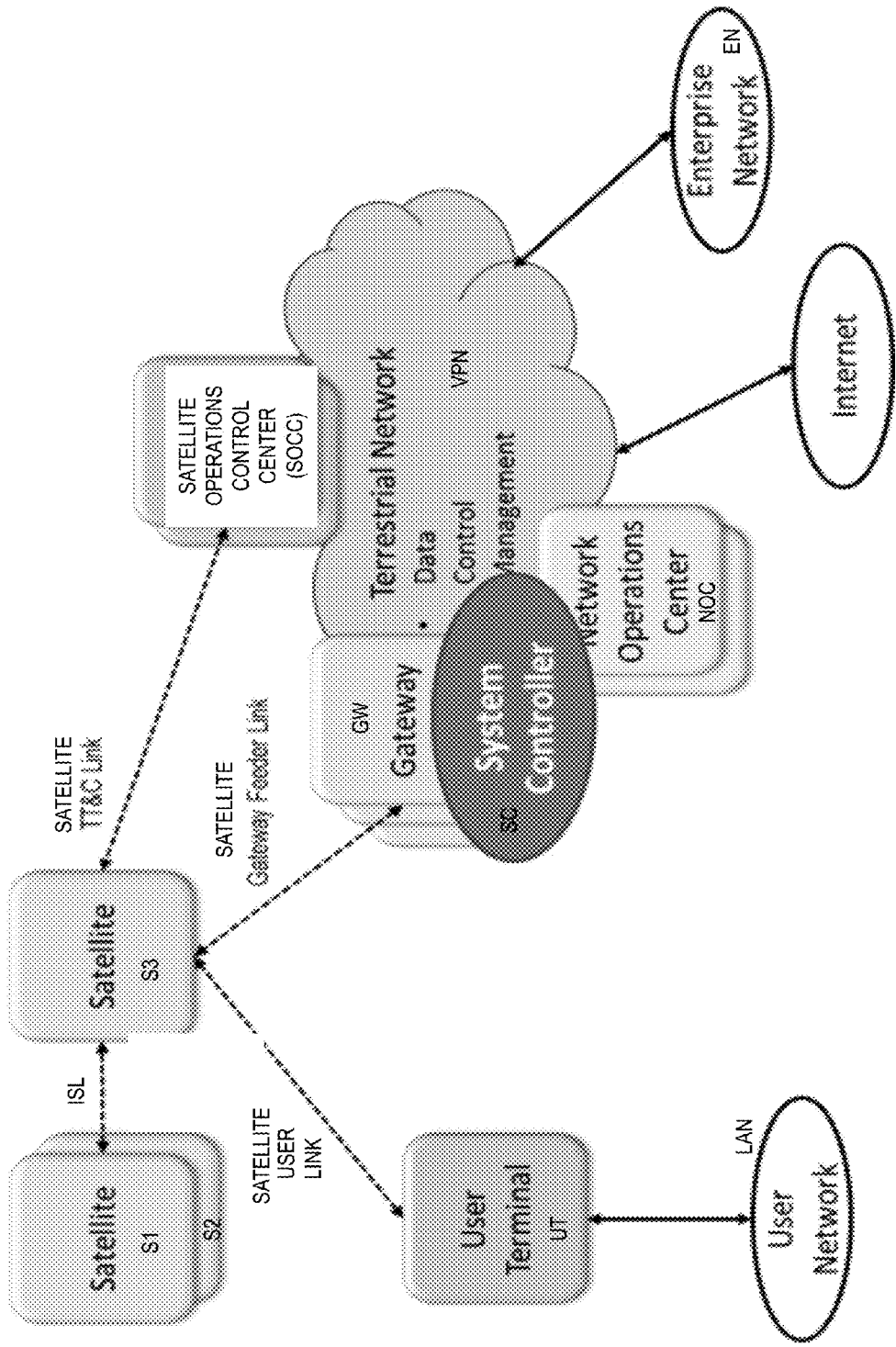
FIG. 2B illustrates a block diagram of a software defined satellite network (such as the SDSN of FIG. 2A) with the System Controller hosted by a network operations control center and associated Gateway (GW), in accordance with example embodiments of the present invention.

FIG. 2B illustrates a block diagram of a software defined satellite network (such as the SDSN of FIG. 2A) with the System Controller hosted by a network operations control center and associated Gateway (GW), in accordance with example embodiments of the present invention. With reference to FIG. 2B, the constellation of satellite nodes (e.g., the LEO satellites S1, S2, S3) are interconnected via the intersatellite links (ISL) (also referred to as cross-links). Further, the satellites are linked with the Gateway (GW) and System Controller (SC) via the satellite gateway feeder link, and are linked with the user network (LAN) via the user terminal (UT) over the satellite user link. By way of example, the payload includes an L2 packet switch that interconnects multiple gateway beams, inter-satellite cross links and user beams. By way of further example, such links may be configured to support from hundreds of Mbps to upwards of several or tens of Gbps of packet traffic (e.g., the switch may be configured for tens of Gbps packet switching capability. Further, one or more Gateways may be employed to connect the satellite network to other networks. Also, the satellites are linked with the Satellite Operations Control Center (SOCC) via the satellite TT&C link for payload and satellite management (e.g., providing system management commands for management control of the satellite and payload, such as commands to enable or disable system functions, commands for steering the satellite, etc., and for receiving tracking and telemetry and other status signals from the satellite). The GW, NOC and SOCC may also interface with one or more enterprise networks (of which one is shown in the figure (EN)) and the Internet via the VPN.

The Gateway (GW) and the Network Operations Center (NOC), which host the System Controller (SC), are networked together via the private terrestrial network (such as a virtual private network or VPN), and are also networked with the SOCC via the VPN. The NOC generally manages network management and control functions, such as bandwidth resource management, configuration, admission/commissioning and administration of customer networks and terminals serviced by the SDSN, system maintenance and customer support functions (e.g., administration of a customer support and trouble ticket management system), etc. The NOC thereby provides centralized management and coordination for the network, and (as further discussed below), in a distributed architecture, the System Controller may be implemented as specific functions operating in the NOC and the Gateways. The user beams connect the network to respective user terminals (UTs). The Satellite Payload may comprise multiple baseband processors to support the satellite uplink, downlink and inter-satellite links. The numbers of Gateway links, user links and inter-satellite links (or beams) are represented by the variables G, U and C, respectively. The packet switch connects the beams and performs packet switching from an ingress link to an egress link. The payload management computer is responsible for payload fault, configuration, accounting, performance and security management. The payload control computer interfaces with the System Controller and acts as an agent for control plane specific functions, such as managing the updates in Forwarding Table for the satellite.

By way of example, communications between the System Controller in each of the network nodes may occur via various different communication paths. The SDSN of example embodiments is a private network, where each of the network nodes is addressable via private internal network addresses, which are not accessible to nodes or terminals outside the network or individual customer terminals that are not network nodes. According to such embodiments, therefore, the communications between the System Controller and the network nodes may be via in band communications over the various data links of the network (e.g., the satellite links between the System Controller and the respective satellites are airborne platforms when in range of the System Controller, via inter-satellite links between a satellite within range of the System Controller and other satellites of the network, via the satellite links between the System Controller and satellites within range of the System Controller and between such satellites in the Gateway and other nodes of the network, via one or more terrestrial networks between the System Controller and the ground-based nodes (e.g., the gateways) of the network, etc.). Further, in rare situations where, for example, a satellite node is not reachable by the System Controller via in band communications, the System Controller may communicate with that satellite via out of band communications, such as the tracking telemetry and control (TT&C) link between that satellite and the respective ground-based satellite control gateway.

In accordance with further example embodiments, the System Controller may be implemented using a distributed physical architecture. In that manner, System Controller components or subcomponents, relating to different network nodes or resources, may be geographically distributed based on the respective network node/resource locations and policy requirements of different geographical jurisdictions (e.g., respective jurisdictional requirements regarding Gateway locations and traffic routing). By way of further example, the global networking policies and network control and management information may be managed by a central Network Operations Center (NOC), while regional Gateways may implement System Controller functions for specific regions. Thereby, with respect to overall network management and control, the operation of the regional Gateways and respective System Controller functions would be ultimately managed and controlled by the master System Controller at the NOC.

Figure 3:
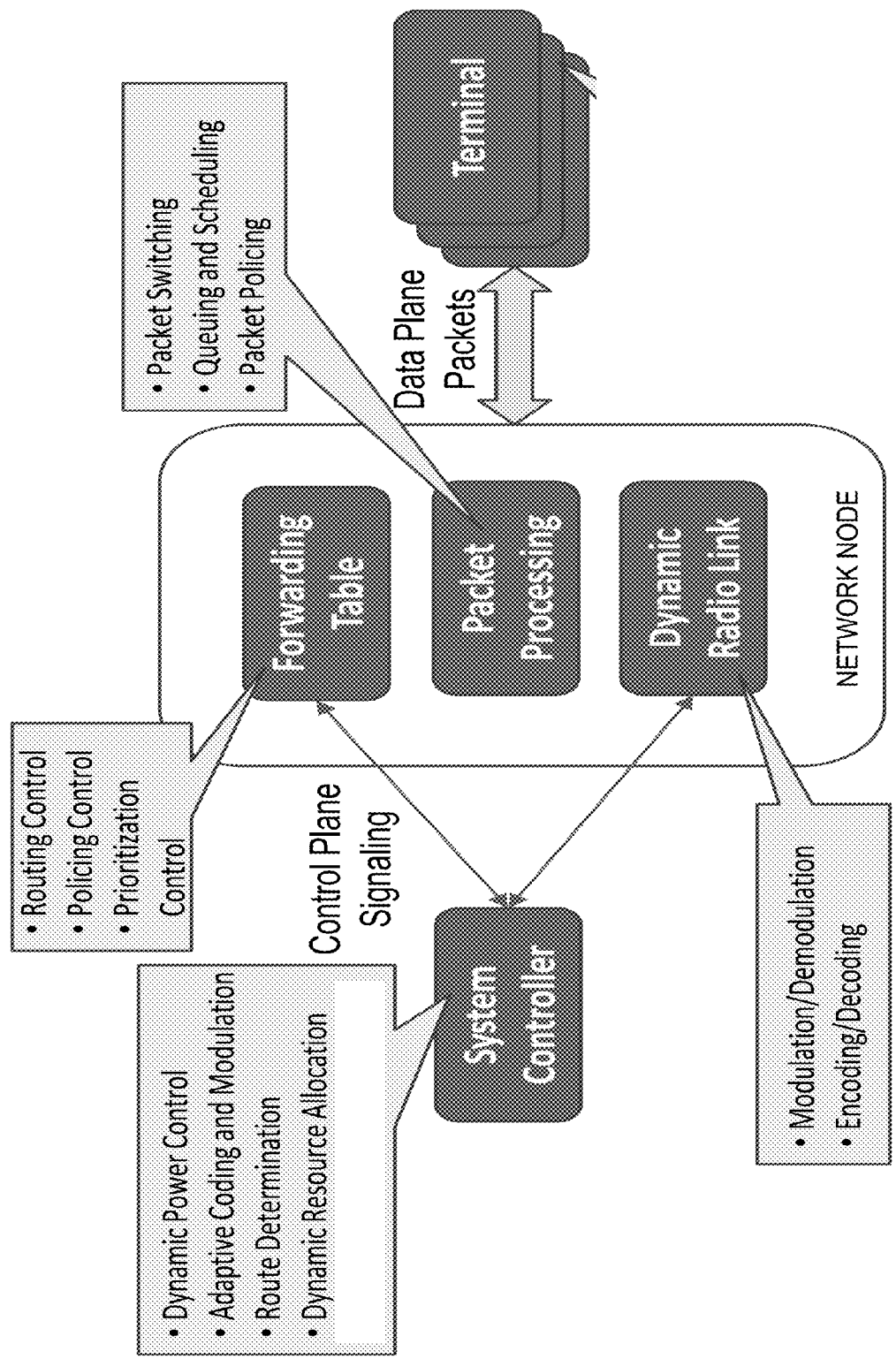
FIG. 3 illustrates a block diagram of a software defined satellite network (SDSN) node, on a functional level, in accordance with example embodiments of the present invention.

FIG. 3 illustrates a block diagram of a software defined satellite network (SDSN) node, on a functional level, in accordance with example embodiments of the present invention. The illustrated data and control plane functions of FIG. 3 also demonstrate an SDSN architecture that includes the foregoing adaptive networking features and functions. Accordingly, ground based System Controllers can provide for management and control for both types (packet processing and dynamic links) of networking features. The first type corresponds to packet processing functions, while the second type includes all functions related to the management of dynamic radio transmission links.

With reference to FIG. 3, each SDSN network node (e.g., a satellite node) includes a Forwarding Table (FT) function, a packet processing function, and a dynamic radio link function. By way of example, the FT function includes a routing control function, a policing control function, in the prioritization control function. In accordance with the routing function, the network node manages the routing function, whereby the network node determines the next hop network node for each received packet. In accordance with the policing control function, the network node determines packet dropping, whereby (in the case of a saturated link) the network node applies policing function to determine which queued packets need to be dropped to alleviate the saturation condition. In accordance with the prioritization control, the network node determines the prioritization of the packets destined for each particular port (link to the next hop network node), whereby, based on the prioritization, the packets are queued in the respective priority queues. As would be appreciated, the policing control and the prioritization control are interrelated. In other words, part of the determination of packet dropping, packet priority must be accounted for on a queue level. For example, within a particular queue the determination of packet dropping will take into account a sub-priority of each packet within the queue—a packet priority relative to the priorities of the other packets in the queue. In that regard, prioritization control may be viewed on a port or link level whereas policing control may be viewed on a queue-by-queue level within each port. With regard to the packet processing function, the network node performs the actual packet switching to the appropriate port (as determined based on the forwarding table), the queuing and scheduling of each packet within respective queues of each port, and the packet policing function regarding the dropping of packets. With further regard to the routing control, policing control and prioritization control functions of the forwarding table and packet processing functions, the routing, packet switching, queuing and scheduling functions are designed to ensure that all packets are routed, prioritized, queued and scheduled two address network and customer requirements. In that regard, the policing control and dropping of packets will only occur in rare situations where, for example, a saturated link condition occurs despite the other functions of each network node. Moreover, the police and control function is performed at a more granular level in the routing and other functions of the network node—e.g., the routing control functions may be occurring on a minute by minute level whereas the police in control and packet dropping function is occurring on a millisecond by millisecond level. Additionally, in the event that the policing control function drops packets, this condition will be reflected by the link state monitoring and reporting function of the network node (whereby the network node reports the status/traffic conditions of each of its links to the System Controller), and would then be addressed by the System Controller via the next Forwarding Table updates to that network node. Further the dynamic real link function comprises control of the actual radio links of the network node. For example, based on a required throughput for a particular link, the network node will configure the respective modulation and demodulation, and the respective encoding and decoding, for the link in order to support that required throughput.

With further reference to FIG. 3, in accordance with the example embodiments, the System Controller performs various functions of the SDSN. According to one embodiment, the system controller may perform a dynamic power control function, whereby the operating power of each of the links of a network node is controlled for optimum system performance. By way of example, for satellite or other airborne network node, each link requires certain power levels to operate at respective throughputs. In that context, when the overall routing of a particular link of the satellite node requires a reduced (lower than maximum) power level, the SC can instruct or specify that the network node configure the particular link to operate at the required power level for the current routes of the Forwarding Table for that link. Subsequently, with updates to the Forwarding Table, the required throughput for a particular link of a network node may require a higher power level. At that point, the SC can instruct or specify that the network node configure the particular link to operate at the higher power level. In this matter, the network node controls its power consumption in an efficient manner, which facilitates adequate recharging of satellite batteries to support the overall network operation. Additionally, the SC may perform and adaptive coating and modulation (ACM) function, whereby it assists the network nodes with the dynamic radio link function—ACM, for example, may be employed to address weather conditions affecting a network node, such as a Gateway. By way of example, when a particular Gateway is encountering weather conditions that degrade its link margins, ACM may be employed to close the links of that Gateway at reduced throughput levels (e.g., the Gateway will employ a more robust and coding and modulation scheme to compensate for the weather condition, however, that more robust coding and modulation would result in a reduced throughput over the respective links). The SC can then also take the reduced throughput into consideration with respect to the route determinations for that network node during the period of the weather condition.

In accordance with example embodiments, a digital processing satellite with a switch can route packets from multiple inputs to multiple outputs including uplink, downlink and also inter-satellite links (ISL). By way of example, scheduling a packet on a specific output link depends on the packet's ultimate destination within the network. Accordingly, a local Forwarding Table is employed to assist with routing to the appropriate destination by keeping a map of the individual packet destinations and the associated next hop node (e.g., on the shortest path to the destination) that is adjacent to the current node. The combination of the satellite packet switch and the local Forwarding Table facilitate the appropriate routing determinations and associated packet scheduling. In accordance with example embodiments, therefore, the System Controller maintains updated Forwarding Tables for the respective forwarding network nodes, and periodically provides the tables to the respective nodes to be used as such a local Forwarding Table. Thus, in accordance with such embodiments, simple satellite-based switching, supported by the System Controller, can provide a rich satellite-based routing fabric within the SDSN framework.

Figure 4A:
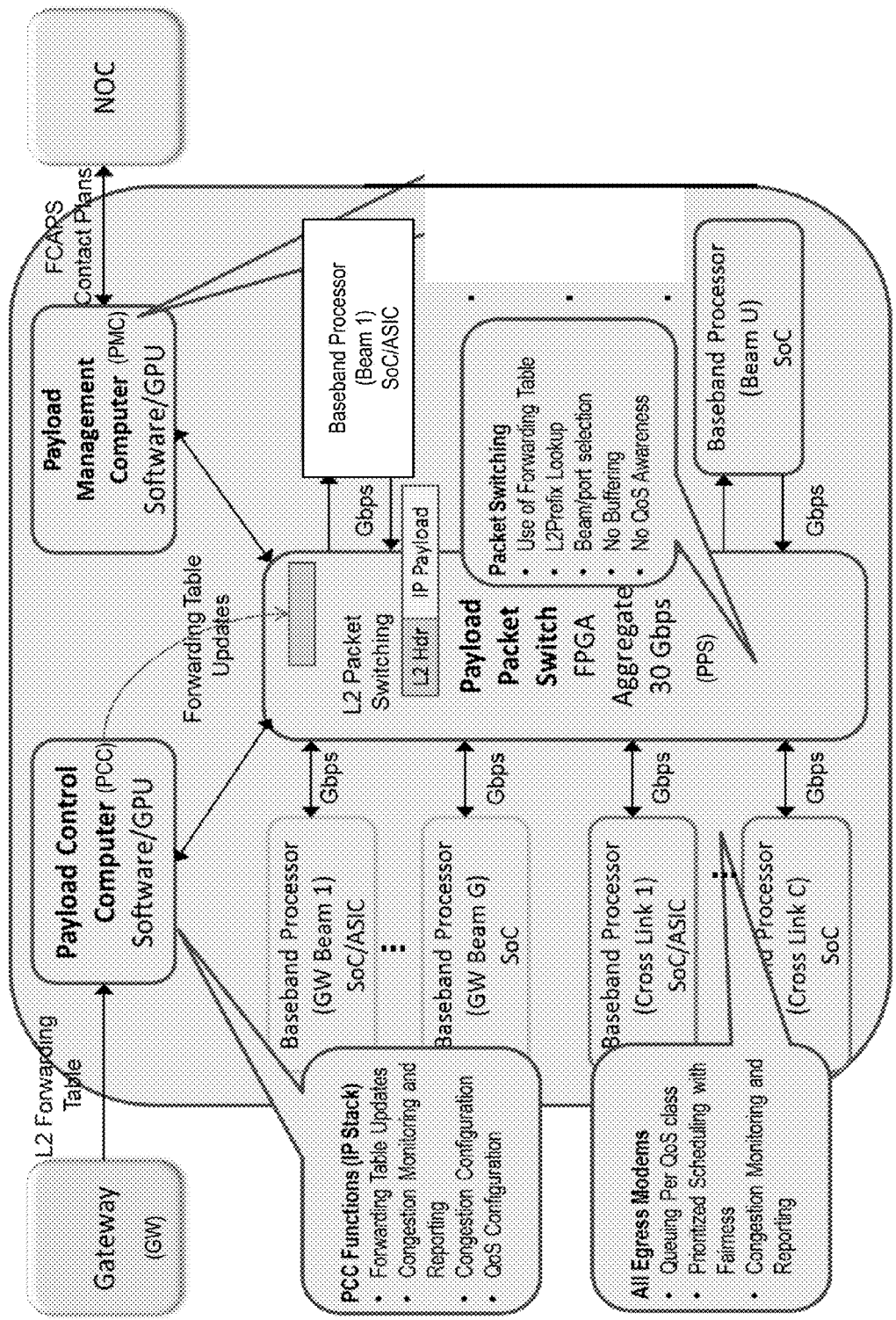
FIG. 4A illustrates a block diagram of a packet switch payload architecture for the satellite of a software defined satellite network (SDSN), where the packet processing functions of the SDSN satellite node are summarized in the annotations for the individual functional blocks, in accordance with example embodiments of the present invention.
Figure 4B:
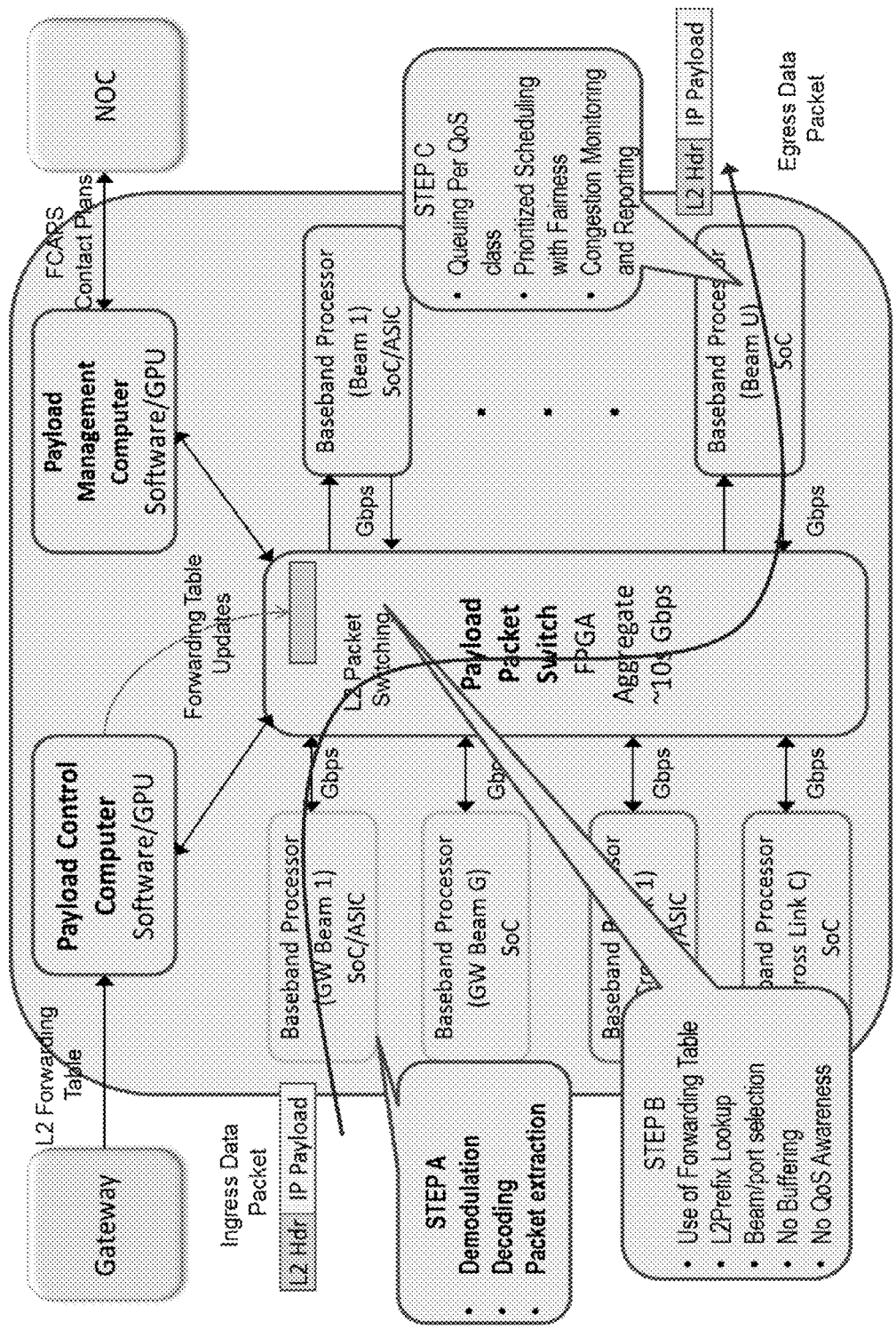
FIG. 4B illustrates a block diagram of the packet switch payload architecture of FIG. 4A, where the packet processing steps of the SDSN satellite node are summarized in the annotations, in accordance with example embodiments of the present invention.

FIG. 4A illustrates a block diagram of a packet switch payload architecture for the satellite of a software defined satellite network (SDSN), where the packet processing functions of the SDSN satellite node are summarized in the annotations for the individual functional blocks, in accordance with example embodiments of the present invention. FIG. 4B illustrates a block diagram of the packet switch payload architecture of FIG. 4A, where the packet processing steps of the SDSN satellite node are summarized in the annotations, in accordance with example embodiments of the present invention.

By way of example, (as specified above) the payload packet switch may be implemented with input queuing and/or output queuing. As one example, output queuing may be implemented to avoid head-of-the-line blocking. As a further example, for higher data rates, output queuing may not be feasible, and thus virtual output queuing may be implemented instead. According to the embodiments described herein, output queuing is employed. With reference to FIG. 4A, the payload control computer may be implemented via a general processing unit (GPU) with embedded software, where the embedded software may be reconfigurable and updatable via software uploads to the PCC. By way of example, the PCC may control/manage such functions as forwarding table (FT) updates from the System Controller for route determinations of the satellite network node. The PCC may further perform link monitoring and reporting for providing link status information to the System Controller (e.g., monitoring of the satellite node links for traffic congestion and other conditions that may affect available throughput and link margin). Further, the PCC may also manage congestion and quality of service configuration. For example, the PCC may be configured to configure and manage the input queues and output queues of the payload packet switch (PPS) to control the priority and quality of service treatment of packets forwarded from the PPS to the respective transmit subsections for transmission to the respective next network node hop destinations.

The baseband processors are configured to receive the analog signal transmissions from the respective receive antenna feed elements, and to process down-convert, demodulate decode) the received signal transmissions to generate the originally transmitted packet stream for each respective signal. For example, the figure depicts a baseband processor for each of the gateway beams 1 to G, for each of the ISL or cross-link beams 1 to C, and for each of the user beams 1 to U. By way of example, each of the baseband processors may be implemented via a system on chip (SOC) or an application specific integrated circuit (ASIC), or a combination of the two. Further, as would be recognized by one of skill in the art, each of the baseband controllers may be implemented by any of many other available hardware and embedded software technologies (e.g., digital signal processor (DSP) technologies), where the implementation would satisfy the requisite processing power and timing and throughput requirements for the respective signal and data processing, and also taking into consideration the overall SWaP constraints of the satellite payload. By way of further example, the baseband processors (egress modems for transmission of the outgoing packet data signals), in conjunction with the PPS, may further perform outbound queuing on a quality of service or traffic type basis, including prioritized scheduling that implements a fairness factor. Further, the egress modems may perform a link condition and traffic/congestion monitoring function in order to feed the necessary data to the PCC for reporting to the System controller.

Moreover, as depicted in the embodiment of FIG. 4A, the payload packet switch PPS component of the packet processing section (e.g., element 143 of FIG. 1) performs the actual packet switching function based on the respective forwarding table. By way of example, for each packet received from the receive section, the PPS utilizes the packet forwarding table (LT), and performs a layer 2 (L2) prefix lookup function. Then, based on the respective entries of the LT, the PPS switches the packet to the appropriate port/beam for transmission to the respective next hop network node. Accordingly, the PPS may not perform any buffering functions or quality of service queuing for the received packets. Such functions may instead be handled by the input and output queuing subsections of the packet processing section, or the respective baseband processors, or a combination thereof.

FIG. 4B illustrates a block diagram of the packet switch payload architecture of FIG. 4A, where the packet processing steps of the SDSN satellite node are summarized in the annotations, in accordance with example embodiments of the present invention. With reference to FIG. 4B, a packet enters the satellite payload node on one of the ingress links (e.g., baseband processor, GW Beam 1. The packet includes a header with an L2 label, which reflects the required route processing of the packet for the respective satellite node. The demodulation and decoding function of the baseband processor (GW Beam 1 modem) processes and extracts the packet (Step A). The GW Beam 1 modem forwards the packet to the Payload Packet Switch (PPS). The Payload Packet Switch determines the L2 label or header of the packet, and searches the Forwarding Table (FT) for the largest prefix match among all routing entries (Step B). As specified above, according to one embodiment, a route entry of the FT includes a traffic type or QoS field, a source address field, a destination address field and a next hop network node route field. The source address field reflects an originating source address of the packet (e.g., reflecting a particular customer node/site or terminal), the destination address field reflects an ultimate destination address for the packet (e.g., reflecting a particular destination customer node/site or terminal), the traffic type or QoS field reflects the traffic type (e.g., indicating a priority level) of the packet, and the next hop network node reflects the intended next network node destination (as determined by the route calculations of the SC in its generation of the respective FT). More generally, by way of example, a Forwarding Table route entry may include certain information or fields, such as a Prefix that provides a search key for indexing the entries of the table, a Next Hop field indicating the intended next network node for the packet (e.g., in the case of a satellite node, a GW beam, another satellite node via an ISL or a user beam), an L2 Label that includes a Layer 2 destination address (the L2 Label can optionally also include QoS and/or a source address for more control over routing decisions (depending on the respective routing function—e.g., shortest path, QoS aware, constraint-based, etc.). Further, the FT may be aggregated by the SC (e.g., as part of the route determination function, discussed below) to reduce the FT size and lookup time.

Multiple routes with the same Next Hop could be represented by a common entry with a Prefix value that is common for all Prefix values for the route entries that have been aggregated. With regard to the terminology the "largest prefix match," because the L2 header route information or Prefix of the packet may relate to multiple entries in the FT, the PPS must find the entry that reflects the intended next hop network node route for the packet. For example, for a given source address (e.g., reflecting a specific enterprise customer), the FT may have a global or general route entry for all traffic types and destination addresses of that customer. For that same source address, the FT may have a specific route for VoIP packets to all destination addresses of that customer. Again, for that same source address, the FT may have a more specific route for VoIP packets to a particular destination address of the customer. In this case, the general route entry will have a short prefix match, the next more specific entry will have a longer prefix match, and the most specific entry will have the largest or longest prefix match. Accordingly, in such instances, the longest prefix match and correspondingly most specific route reflects the intended next hop network node route for the packet.

If the Packet L2 label points to the satellite itself, then a full L2 destination address in the packet is used to find the location destination within the satellite (e.g., L2 address includes orbital plane, satellite, beam ID) and the respective port is selected (Step B). Alternatively, the selected route entry may specify a user beam or gateway beam as the next network node hop, in which case the respective egress port for the user or GW beam is selected (Step B). As a further alternative, the packet may contain management or control commanding destined for the particular satellite node, in which case the packet would be forwarded to the appropriate payload computer for management and/or control of the satellite/payload (Step B). Accordingly, the PPS forwards the Packet to the Baseband Processor of the egress beam reflected by the selected Next Hop FT entry (Step B).

Then, according to the present embodiment, the respective egress Baseband Processor performs packet the queuing, congestion monitoring, prioritized scheduling, and dropping on the respective egress link, which is implemented in each egress modem (Baseband Processor) (Step C). By way of example, each such egress modem (for the selected link port) includes a dedicated queue for each QoS class, which is configured to apply a prioritized and fair scheduling algorithm for ordering of the packets as they are forwarded for modulation and transmission. Further, queuing information for each port/queue would be used as an indicator of traffic conditions regarding the port, which would be forwarded to the SC as part of the traffic condition or congestion reporting (e.g., configurable low watermark and high watermark congestion thresholds may be employed for the respective occupancy of each port queue) (Step C). By way of example, each egress beam processor performs traffic congestion monitoring (and reporting to the NOC/SC) at each egress link, where congestion monitoring information may include the following information: user beam, gateway beam, cross link; and fullness/size of the packet queue (prior to the transmission) if a configured threshold has been crossed. Further, according to one embodiment, the anchor gateway can optionally timestamp packets (for offloading QoS-aware packet scheduling), but packets from ISLs may introduce packets contention.

With regard to congestion or traffic conditions, in accordance with example embodiments, various example congestion scenarios may be encountered, and respective mitigation approaches may be performed, as follows. By way of example, with a satellite node to user terminal link (GW User Beam downlink), where there is no congestion from respective Gateway because of GW knowledge of available capacity and congestion level, ISLs may introduce transient load from other satellites and gateways that may exceed traffic engineering estimates. In which case, as one example, the FTs for the respective ISL links could be updated to alleviate the transient traffic load of the overloaded GW user beam link. As a further example, the egress modems of each satellite node ISL that is providing such transient traffic may employ Ethernet pause frames to throttle the traffic of the respective satellite over the respective ISL. Alternatively, with a Satellite node to Gateway node link (Gateway Beam downlink), the egress modem uses Ethernet pause frame to throttle the source satellite for ISL traffic, which may trigger pause frames on the ISLs. With a user terminal node to satellite node link (User Beam uplink) congestion may be mitigated by the Gateway via throttling of the local traffic from the user terminals. For example, for the user terminal to satellite link, the payload control computer provides congestion reports to the Gateway, and the GW adapts respective resource allocations to the user terminal based on the respective destination congestion level (e.g., local satellite to gateway beam).

With regard to route determination algorithms, traditional shortest path route determination (e.g., using OSPF) would require global link state distribution to each routing node. In the current terrestrial approach (typically with limited number of interconnected nodes), the network is flooded with link state information to achieve such a global link state distribution. This approach, however, would not scale well for SDSNs employing airborne network nodes, such as satellite nodes. For one thing, the flooding of the network in a satellite network would result in an inefficient use of already scarce and valuable satellite link resources (bandwidth). Further, in a satellite system (by contrast to the traditional terrestrial system), there are potentially thousands of possible source and destination terminals, where some of which themselves serve as routing nodes. With a simplified reuse of the terrestrial approach for satellite networks (that do not employ the centralized, ground-based SDSN route determination approaches of the present invention), therefore, each routing node would have to get all link state information and perform route determinations individually in a distributed fashion. In accordance with example embodiments, however, the SDSN approaches of the present invention, route determination can be efficiently and effectively performed by a centralized entity (e.g., the System Controller), which leverages scalable computing resources. By way of example, the System Controller (being a ground-based processing entity), can be implemented via any number of server entities configured as a logically centralized processing system—which can be easily expanded/upgraded as the system grows. Moreover, the System Controller benefits from streamlined link state data collection (e.g., only one copy goes to the System Controller and not all routing nodes), and route distribution (e.g., single step broadcast, and multicast to distribute common routes).

Optimal, as opposed to shortest, path to a destination depends on various factors including the data rate of the links, current traffic load, customer service level assurance (SLA) agreements involving delay, jitter and packet loss objectives, and node congestion levels. In accordance with example embodiments, however, with shared radio resources, the link data rates can be dynamically modified the System Controller in support of the route determinations included in the Forwarding Table of the respective network node. By way of example, radio link parameters (e.g., transmit rates and associated modulation and coding) can be dynamically adjusted to modify throughput rates (transmit bandwidth) of the respective link. Further, a centralized routing algorithm at the System Controller can use the extended network-state information and dynamically manage the links and the Forwarding Tables to ensure that local packet scheduling is aligned with unified system performance goals. Whereas, a distributed routing algorithm (e.g., as with prior systems, where individual routing algorithms run at every node and use of link state information flooded in the entire network) is less suitable for resource constrained satellites because of suboptimal decision making results. By further contrast, in accordance with example embodiments, the ground-based System Controller has system-wide knowledge of network state, link loads, customer expectations, traffic requirements, link capacity state and operational constraints, which facilitates optimal decision making in determining the routes (e.g., Forwarding Tables) uploaded to the nodes, which perform the packet switching and routing functions. By way of example, all such network objectives (e.g., link state collection and optimal decision making) can be addressed by employment of fast data forwarding capabilities in network nodes, and performing optimal route determination in the centralized System Controller.

Figure 5:
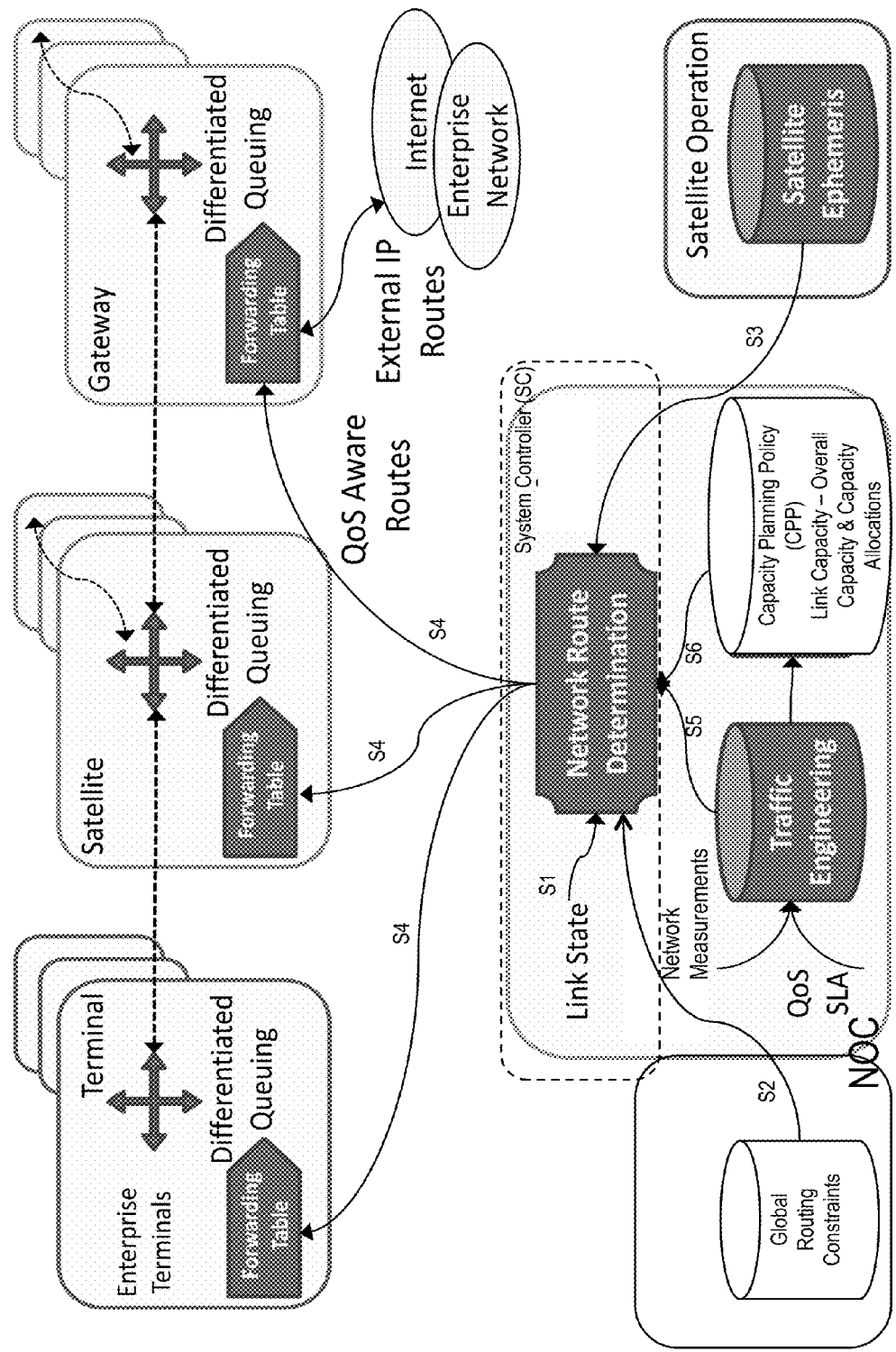
FIG. 5 illustrates a block diagram depicting an enhanced route determination by a ground-based System Controller, in accordance with example embodiments of the present invention.

FIG. 5 illustrates a block diagram depicting an enhanced route determination function (RDF) by a ground-based System Controller, in accordance with example embodiments of the present invention. FIG. 5 provides a high level architecture of the SDSN route determination by the ground based System Controller. By way of example, the System Controller collects link states (e.g., delay, throughput and congestion level) for various links (including uplink, downlink and ISLs), connecting the satellites, gateways and terminals, for determining various routes. By way of further example, as described earlier, the System Controller may be implemented in a distributed architecture for scalability and alignment with operations and management strategies and requirements. In one distributed architecture, for example, the NOC maintains and provides global routing constraints, business conditions and link operational costs, while distributed Gateways host route determination functions.

According to example embodiments, for traditional shortest path routing, the System Controller can be configured to first use satellite ephemeris data (data regarding position and movement of the satellite node) to predetermine constellation topology and estimated link states (e.g., based on historical data) to generate preliminary shortest paths. Additionally, the System Controller can subsequently use incremental routing algorithms (such as, an incremental version of Dijsktra's algorithm, for example, as addressed in the publication: Luciana, B., et al., "Speeding up dynamic shortest path algorithms," INFORMS Journal on Computing, 2008) to determine all shortest paths for a node (e.g., as source of a path) just prior to providing the revised Forwarding Tables to that node. The System Controller can keep updating the Forwarding Tables for a specific node with actual link states as they continue to be collected from the network until just before (duration depends on available computing resources and network size) the specific Forwarding Table has to be transmitted to that particular node.

According to further example embodiments, for more optimal routing control, for example, with respect to a defined Service Level Agreement (SLA) comprising specific traffic sources and QoS objectives, the System Controller can be configured to additionally use network traffic engineering estimates (e.g., for different traffic types) and available frequency resources (e.g., uplink, downlink and inter-satellite link) to perform multi-objective and multi-constraints based route determinations (e.g., as discussed in the publication: Younis, O., and Fahmy, S., "Constraint-based routing in the Internet: basic principles and recent research," IEEE Communications Surveys and Tutorials, 2003). By way of example, a resource pool for an organization may correspond to the expected aggregate traffic from a source to a destination geographical area where the organization's terminals are located. The resource pools are maintained in a database (e.g., arranged hierarchically for each service providers and their respective enterprise customers, for example, as addressed in the publication: Gopal, R., ".Net-centric satellite mesh architecture for emergency communication," IJSCN 2010), and are used for packet flow level connections admission control, which needs to be consistent with the actual QoS-aware routes that the packets would take over the satellite switches based on their respective Forwarding Tables.

According to further example embodiments, the System Controller-based route determinations can support QoS aware packet processing capability in a dynamic environment (e.g., for MEO and LEO satellites, and for HAP platforms), where network topology and associated routes can change in seconds. In such systems, System Controller-based algorithms can enable optimal routing across all sources and destinations. A ground-based System Controller can be configured to utilize scalable CPU and memory architectures to include multi-objective routing criterion (such as shortest delay and highest data rate), which has typically not been possible in current systems, even in the terrestrial routers for large networks. Additionally, keeping route determination in a centralized location facilitates security enhancements in the routing architecture, as compared to a distributed option where a rogue router can inject erroneous routes into the network. The (logically) centralized router determination facility, or (logically) centralized System Controller, thereby better protects against malware, intrusions and other operational vulnerabilities. For such logical centralization, suitable computing technologies (such as database replication, message replication, etc.) can be utilized to physically and geographically distribute the System Controller for more robustness and scalability.

In accordance with example embodiments, the RDF collects links state information from all nodes (e.g., terminals, gateways and satellites) and generates and distributes global L2 Forwarding Tables for all main forwarding nodes (e.g., the satellites and enterprise terminals anchored by the parent gateway). By way of example, a destination address based RDF algorithm can be described as follows.

In accordance with one embodiment, with reference to FIG. 5, a shortest path routing function can be implemented in a destination address based RDF algorithm—where the algorithm is performed for each of the main forwarding network nodes (e.g., satellites, gateways and enterprise terminals), and S represents the number of such network nodes in the network. The algorithm generates the shortest path from each source $S_i$ where i iterates from 1 to S. The SC collects link states (e.g., delay, throughput, congestion-level, etc.) from all core L2 nodes (S1). By way of example, such link states include (a) for each satellite—all respective user uplinks and downlinks, and ISL links, (b) for each enterprise terminal anchored by a gateway—all respective user uplinks and downlinks), (c) for each gateway—all respective gateway feeder uplinks and downlinks. The SC receives and processes global routing constraints from the NOC (e.g., constraints on the available routes—such as, an enterprise may place constraints on the nodes through which certain data is permitted to pass through, or certain governmental rules that a jurisdiction may place with respect to the routing of certain data through nodes located in the respective jurisdiction) (S2). By way of example, such global routing constraints include (a) parametric link (e.g., business) cost definitions for each link (e.g., original and subsequent updates driven by business), which are used in the Length (u,v) measure between two nodes (described below), (b) geographical constraints for sending traffic on all uplinks, downlinks and inter-satellite links (e.g., by adding/deleting specific network links connecting two nodes and/or changing the value of the associated Length(u,v) measure between two nodes). Further, routing constraints may also be built into or addressed by respective SLAs of an enterprise customer. The SC obtains and uses satellite ephemeris information to predetermine constellation topology (e.g., the network topology with regard to the association between satellites, gateways and terminals) and respective estimated link states, and then uses estimated link states to generate preliminary shortest path routes to all destination nodes with the network node $S_i$ as the source (S3). By way of example, the SC uses an incremental shortest path algorithm (e.g., an incremental version of Dijkstra's algorithm, as described below) to determine shortest paths from $S_i$. Further, the SC continually updates the Forwarding Tables for $S_i$ with actual link states as they continue to be collected from the network. For example, the SC continually updates the forwarding tables until a preconfigured time (e.g., for a LEO satellite the preconfigured time may be 500 ms based on the orbital speed of a typical LEO satellite) before the specific Forwarding Table is transmitted to node $S_i$. By way of further example, the SC performs route aggregation prior to transmission to reduce the size of the Forwarding Table, which collapses multiple entries with the same Next Hop that can share a common L2 Label Prefix (as discussed above). The SC then distributes a global L2 Forwarding Table to L2 node $S_i$ (S4).

According to one example embodiment, Dijsktra's Shortest Path Algorithm for the network topology, represented as a graph with vertices corresponding to the network nodes, is described below. Here the function Distance (and associated measure Length of a link directly connecting vertices u and v) corresponds to the networking distance between two nodes. This function could represent a specific aspect of packet transport behavior. Typical implementations of Distance function include packet transport delay, packet loss, network hop, etc.

```
1   function ShortestPath(Graph, S_i):
2       Distance[S_i] := 0              // Distance from source to source
3       for each vertex v in Graph:     // Initializations
4           if v ≠ source
5               Distance[v] := infinity      // Unknown distance function from source S_i to v
6               previous[v] := undefined     // Previous node in optimal path from source S_i
7           end if
8           add v to Q                  // All nodes initially in Q
9       end for
10
11      while Q is not empty:           // The main loop
12          u := vertex in Q with min Distance[u] // Source node in first case
13          remove u from Q
14
15          for each neighbor v of u:           // where v has not yet been removed from Q.
16              alt := Distance[u] + length(u, v)
17              if alt < Distance[v]:           // A shorter path to v has been found
18                  Distance[v] := alt
19                  previous[v] := u
20              end if
21          end for
22      end while
23      return Distance[ ], previous[ ]
24  end function
```

The shortest path between the source $S_i$ and a specific target can then be generated with the following steps.

```
1 Path := empty sequence
2 u := target
3 while previous[u] is defined:    // Construct the shortest path with a
                                    stack Path
4    insert u at the beginning of Path   // Push the vertex into the stack
5    u := previous[u]              // Traverse from target to source
6 end while
```

Incremental versions of the ShortestPath algorithm (e.g., as addressed in the publication, Luciana, B., et al., "Speeding up dynamic shortest path algorithms," INFORMS Journal on Computing, 2008) deal with the case where only minor changes in graphs need to be accommodated. For example, it is likely that most links and satellite locations will be very close the estimates made with network historical data and satellite ephemeris information. This processing can be done in advance (to reduce the peak computing resources required at the System Controller). In the unlikely event that there is a link failure, only a small number of the Length measures between two nodes will have to be adjusted. This would affect only a small part of the network graph and most of the original processing performed with estimated information can be reused and updated incrementally for the part of the graph affected by the Link change instead of recalculating all shortest paths again for the entire graph.

With regard to QoS aware routing, in accordance with example embodiments, an enhanced QoS aware destination address based RDF algorithm for determining shortest paths is described as follows (again, where S represents the number of network nodes (satellites, gateways and enterprise terminals) in the network. The algorithm generates the shortest path for each QoS class $Q_j$ where j iterates from 1 to Q, and from each source $S_i$ where i iterates from 1 to S. Similar to the above RDF process, the SC collects link states (e.g., delay, throughput, congestion-level, etc.) from all core L2 nodes (S1). By way of example, such link states include (a) for each satellite—all respective user uplinks and downlinks, and ISL links, (b) for each enterprise terminal anchored by a gateway—all respective user uplinks and downlinks), (c) for each gateway—all respective gateway feeder uplinks and downlinks. The SC receives and processes global routing constraints from the NOC (S2). By way of example, such global routing constraints include (a) parametric link (e.g., business) cost definitions for each link (e.g., original and subsequent updates driven by business) for each QoS class $Q_j$, (b) Geographical constraints for sending traffic on all uplinks, downlinks and inter-satellite links for each QoS class $Q_j$. The SC obtains and uses satellite ephemeris information to predetermine constellation topology (e.g., the network topology with regard to the association between satellites, gateways and terminals) and respective estimated link states, and then uses estimated link states to generate preliminary shortest path routes (for the Forwarding Tables) in each QoS class $Q_j$ with $S_i$ as the source node (S3). By way of example, the SC uses an incremental Dijsktra's algorithm to determine shortest paths for each QoS class $Q_j$—which is similar to the ShortestPath algorithm where Distance($Q_j$) and Length($Q_j$) functions are parameterized with QoS class $Q_j$. Further, the SC continually updates the Forwarding Tables for the L2 node $S_i$ with actual link states as they continue to be collected from the network. For example, the SC continually updates the forwarding tables until a preconfigured time (e.g., for a LEO satellite the preconfigured time may be 500 ms based on the orbital speed of a typical LEO satellite) before the specific Forwarding Table is transmitted to node $S_i$. By way of further example, the SC performs route aggregation prior to transmission to reduce the size of the Forwarding Table, which collapses multiple entries with the same Next Hop that can share a common L2 Label Prefix (as discussed above). The SC then distributes a global L2 Forwarding Table to L2 node $S_i$ (S4).

With regard to constraint-based routing, in accordance with example embodiments, an enhanced destination address based RDF algorithm, for determining paths, for example, constrained by a minimum data rate on each link contained in the path, is described as follows (again, where S represents the number of network nodes (satellites, gateways and enterprise terminals) in the network. The algorithm generates the shortest path from each source $S_i$ where i iterates from 1 to S. Again, the SC collects link states (e.g., delay, throughput, congestion-level, etc.) from all core L2 nodes (S1). By way of example, such link states include (a) for each satellite—all respective user uplinks and downlinks, and ISL links, (b) for each enterprise terminal anchored by a gateway—all respective user uplinks and downlinks), (c) for each gateway—all respective gateway feeder uplinks and downlinks. The SC receives and processes global routing constraints from the NOC (S2). By way of example, such global routing constraints include (a) parametric link (e.g., business) cost definitions for each link (e.g., original and subsequent updates driven by business), (b) geographical constraints for sending traffic on all uplinks, downlinks and inter-satellite links. The SC obtains and uses satellite ephemeris information to predetermine constellation topology link data rates from a Resource Planning Function (RPF) (described in further detail below) and respective estimated link states, and then uses estimated link states to generate preliminary shortest path routes to all destination nodes with the network node $S_i$ as the source (S3). By way of example, the SC determines a subset of constellation network topology to include only those links that satisfy the constraint (e.g., a minimum data rate) per a respective customer SLA requirement. The SC then uses an incremental version of Dijsktra's Shortest-Path algorithm (described earlier) to determine shortest paths using the subset of links and nodes (per the applicable constraints—e.g., minimum data rate) for source $S_i$. Further, as with the foregoing algorithms, the SC continually updates the Forwarding Tables for the L2 node $S_i$ with actual link states as they continue to be collected from the network. For example, the SC continually updates the forwarding tables until a preconfigured time (e.g., for a LEO satellite the preconfigured time may be 500 ms based on the orbital speed of a typical LEO satellite) before the specific Forwarding Table is transmitted to node $S_i$. Further, the SC obtains and uses network traffic engineering (TE) estimates and SLAs from NOC (S5), and capacity plan information from the RPF (S6), to define constraints-based routes on a subset of nodes and links (S5/S6). By way of example, source and destination for TE and Capacity Plan Policy (CPP) may reflect geographical areas (e.g., cells of satellite user beam size) where respective terminals are located, TE estimates may reflect the entire system at traffic type level, CPP may reflect bulk resource allocations at gateway, service provider and enterprise customer levels, and individual link capacity may be maintained by resource planning function databases. The SC then distributes a global L2 Forwarding Table to L2 node $S_i$ (S4).

Moreover, as would be recognized by one of skill in the art, without departing from the intended scope of potential embodiments of the present invention, various additional route determination algorithms may be employed by the System Controller in addition to or as an alternative to the foregoing discussed algorithms. Additionally, as would be further recognized by one of skill in the art, multiple different routing algorithms (including the foregoing discussed algorithms and any applicable additional routing algorithms) may be combined as required by system requirements—for example, according to example embodiments, an SDSN implementation may employ QoS-aware and constraints-based routing concurrently. Moreover, as would also be appreciated, various steps of these algorithms can be combined for efficiency and also run concurrently to reduce computation time. Further, for embodiments with smaller numbers of networking nodes, an incremental version of Dijsktra's algorithm would not be necessary, as all shortest paths could be determined using actual network link states when needed (instead of determining preliminary paths with estimated network topology, and then updating the routes just in time before a Forwarding Table is uploaded to the respective node).

According to further example embodiments, the RDF may maintain several databases. By way of example, the RDF maintains a Link State Database, which Stores estimated and actual (historical and latest) information from satellites, gateways and enterprise terminals for all links of the network, and stores associated business cost information from NOC definitions. By way of further example, the RDF maintains an Incremental Routing Data Structure, which includes incremental shortest path data structures and graphs to support incremental shortest paths and constraints-based route determinations (which tracks resource allocations on links during route determination). By way of further example, the RDF maintains an L2 Forwarding Table for each satellite anchored by the gateway, where each row of the Forwarding Table stores an L2 prefix and L2 next hop.

As described above, the RDF operation requires link state information (e.g., data rate, capacity, delay, packet loss, etc.) to determine optimal routes based on respective SLAs. Further, as also described above, the RDF operation also requires traffic engineering estimates between source and destination nodes. Moreover, with satellite networks, frequency resources are used to establish various types of links. In accordance with example embodiments, therefore, a resource planning function (RPF) is employed to manage resources (e.g., bandwidth/capacity) plans for all radio resources (e.g., at service provider and enterprise customer levels), which resources are used by the satellites, gateways and terminals anchored by the parent Gateway that manages the respective RPF. By way of example, the RPF is used to support constraints-based routing and to ensure specific SLAs for individual service providers and enterprise customers.

In accordance with an example embodiment, with further reference to FIG. 5, specific steps of such a resource planning function are outlines as follows. The SC receives Capacity Plan Policy (CPP) information from NOC for use in resource allocation decision-making (S6). By way of example, such CPP information comprises various thresholds, arbitration rules, prioritization rules, etc. for allocations to service providers and enterprises, which may be determined on a location basis (e.g., source cell and destination cell) and at hourly time granularity. The SC then processes requests for bulk resource requests, consults resource databases, and provides bulk allocations as follows: (a) to the Parent Gateway (gateway forward link resources), where the GW uses the bulk allocation to allocate resources on gateway uplinks based on terminal, customer and traffic type; and (b) to satellites anchored by the parent Gateway (user satellite link resources), where the satellite uses the bulk allocation to allocate resources on user uplinks based on terminal, enterprise customer and traffic type. Further, the SC processes requests from the RDF to support the use of specific link resources for constraints-based routing (as described above) at each enterprise customer level. By way of example, based on the RDF, the SC determines routes while deciding incremental capacity allocations on each link contained in the path from the source and destination—using individual links (uplink, downlink, ISL) for satellites anchored by the parent Gateway. By way of further example, based on the RDF, the SC performs all book keeping at Service Provider and Enterprise level as incremental capacities are allocated for the routes determined via the RDF.

According to further example embodiments, the RPF may maintain several databases. By way of example, the RPF maintains a Gateway Resources database tracking total resources allocated for all geographic areas (cells) that are served by the terminals anchored by the Gateway, and granularity of bulk resource allocations (e.g., source and destination geographical area (cell is the size of satellite user beam), time granularity in hours, capacity granularity in Mbps). By way of further example, the RPF maintains a Service Provider Resources database, which is similar to the Gateway Resources database, but is divvied up across multiple service providers, and also includes common pool shared by all services providers. By way of further example, the RPF maintains an Enterprise Resources database, which is similar to the Service Provider Resources database, but is divvied up across multiple enterprise customers of a service provider, and also includes a shared pool shared by all enterprise customers belonging to a service provider.

FIGS. 6A to 6E illustrate routing scenarios of various example embodiments of the present invention. For example, based on the scalable computing made possible by the ground-based System Controller and RDF of such embodiments, it is possible to process destination addresses, source addresses, traffic type, traffic estimates and hierarchical link capacities, along with existing traffic estimates and link states, and to generate associated Forwarding Tables in near-real time. The Forwarding Tables are uploaded to satellite payloads which then enable packet routing based on the global network knowledge of the System Controller that is embodied in the Forwarding Tables and other information provided to the network nodes.

Figure 6A:
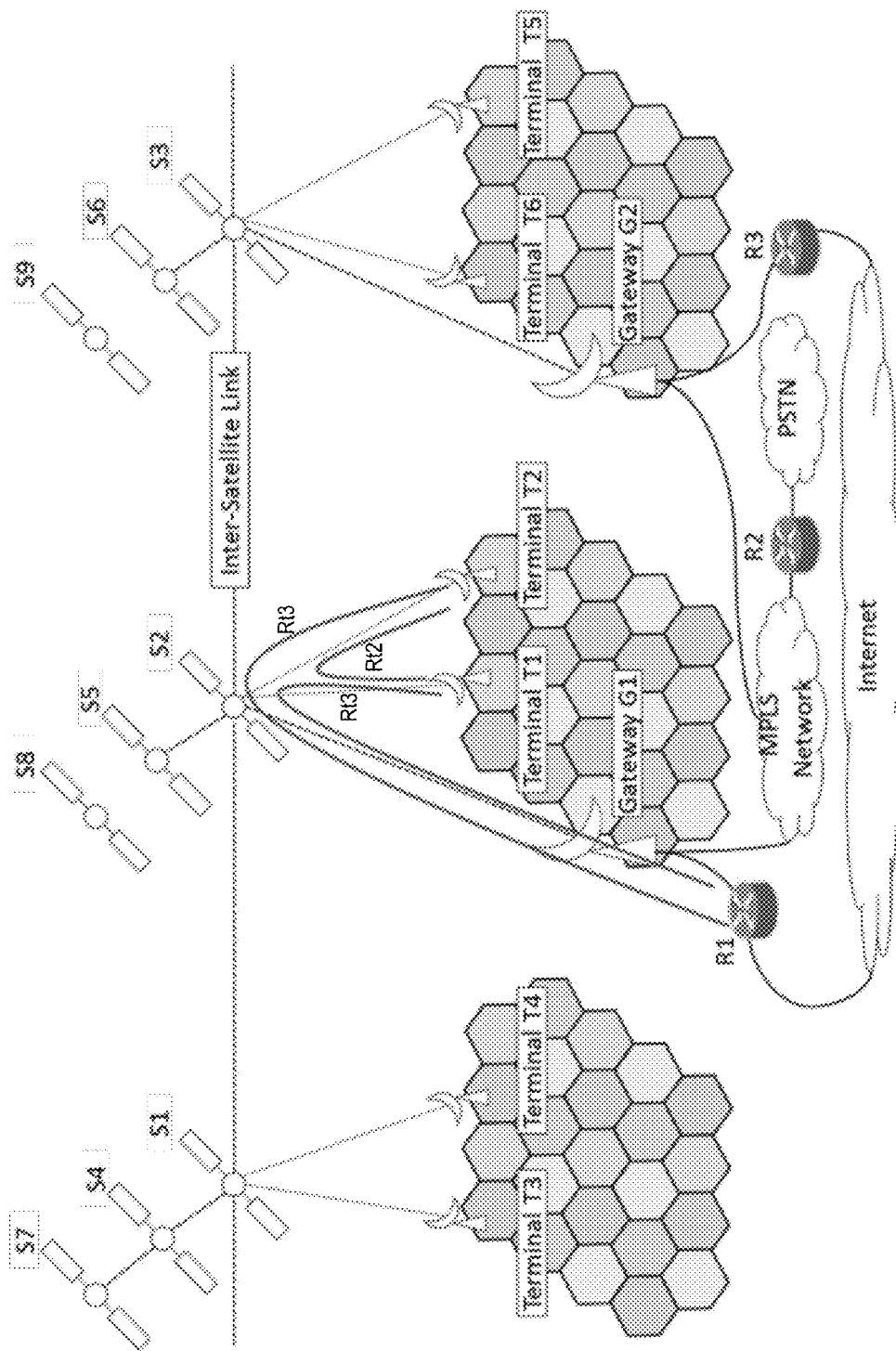
FIG. 6A illustrates a diagram depicting a shortest path route (e.g., resulting from a route determination based on the destination address of the user data packets), in accordance with example embodiments of the present invention.

FIG. 6A illustrates a diagram depicting a shortest path route (e.g., resulting from a route determination based on the destination address of the user data packets), in accordance with example embodiments of the present invention. By way of example, the routing scenario of FIG. 6A may reflect a situation where the Forwarding Table in the Satellite S2 is configured to send all traffic (represented by the routes Rt1, Rt2, Rt3) from terminals T1 and T2 to the terrestrial router R1 using the Gateway Beam to G1. By way of example, the prefix column of the Forwarding Table may contain only the destination address as the key to find the Next Hop. In this scenario, all traffic takes the shortest path to the destination.

Figure 6B:
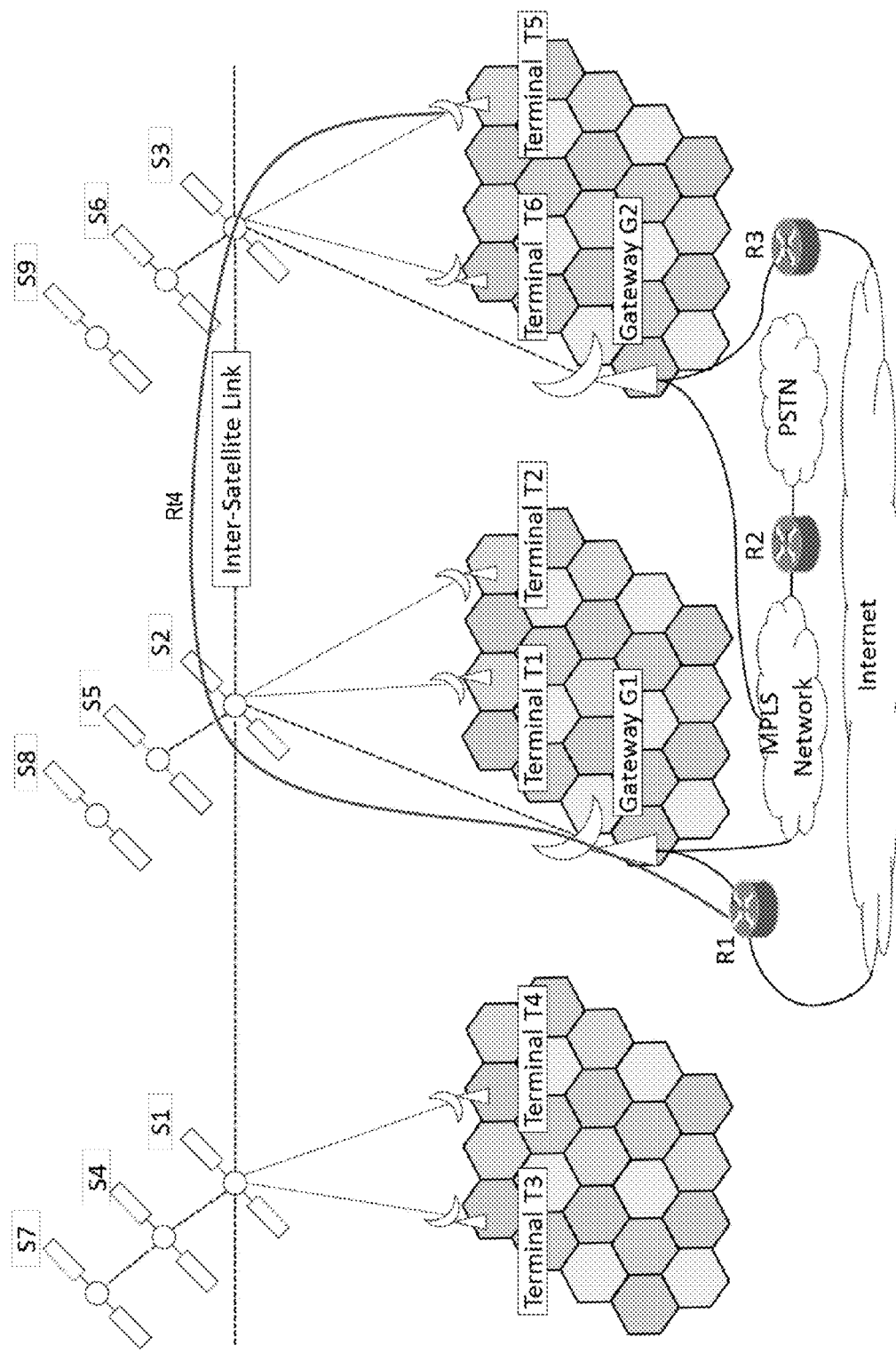
FIG. 6B illustrates a diagram depicting a policy-based route (e.g., resulting from a route determination based on the destination address of user data packets and routing constraints (not the shortest space-borne path)), in accordance with example embodiments of the present invention.

FIG. 6B illustrates a diagram depicting a policy-based route (e.g., resulting from a route determination based on the destination address of user data packets and routing constraints (not the shortest space-borne path)), in accordance with example embodiments of the present invention. With reference to FIG. 6B, the traffic (represented by the route Rt4) routed from terminal T5 via Satellite S3, Satellite S2, and Gateway G1 instead of using the nearest Gateway G5. By way of example, a geographical constraint may preclude the use of Gateway G5, thus using the path to Router R1 via Gateway G1.

Figure 6C:
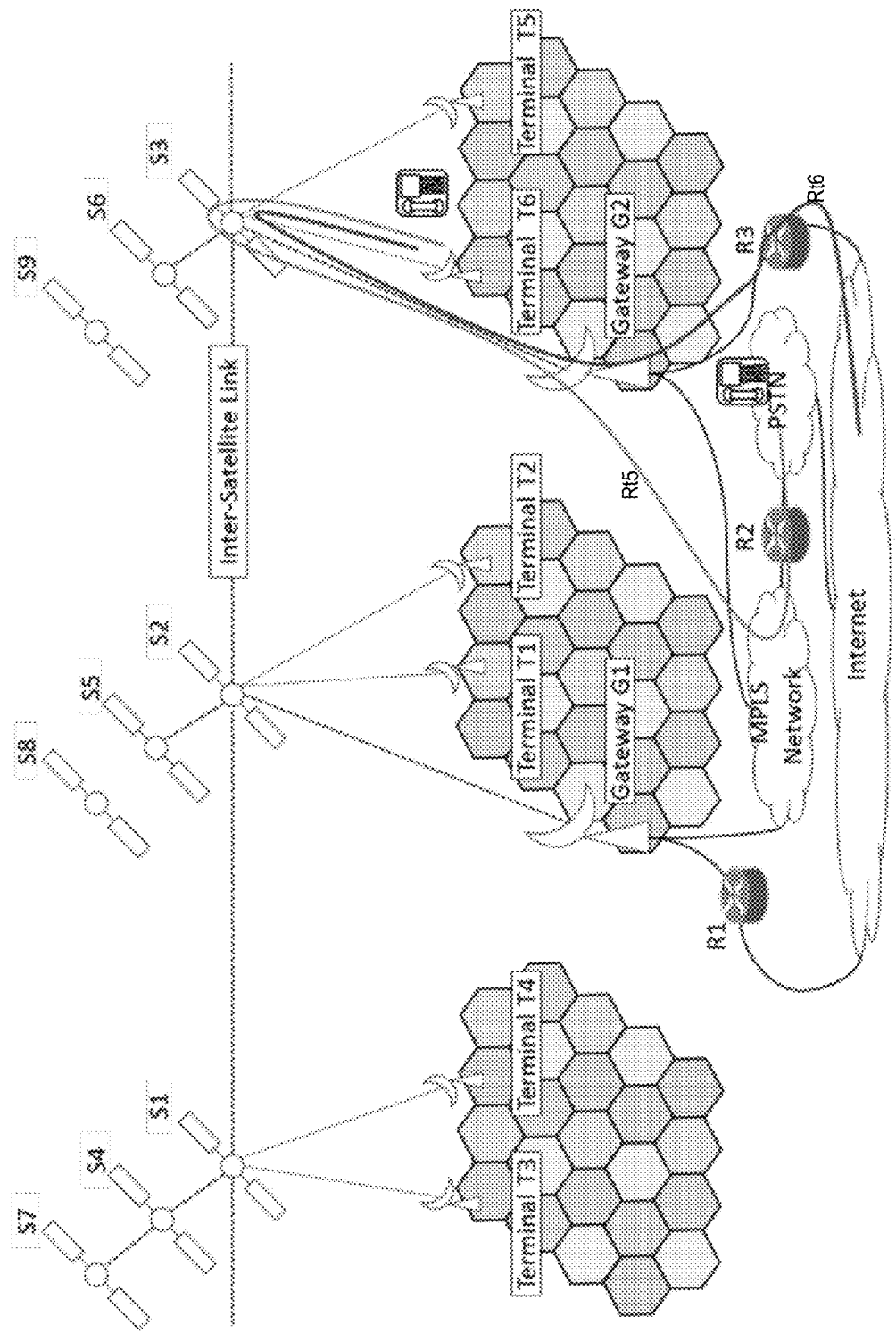
FIG. 6C illustrates a diagram depicting a quality-of-service (QoS) aware route (e.g., resulting from a route determination based on the destination address and QoS level of user data packets), in accordance with example embodiments of the present invention.

FIG. 6C illustrates a diagram depicting a quality-of-service (QoS) aware route (e.g., resulting from a route determination based on the destination address and QoS level of user data packets), in accordance with example embodiments of the present invention. With reference to FIG. 6C, two types of traffic may originate from Terminal T6. Delay critical (Voice over IP) traffic may have packets of a specific QoS marking in their packet header, whereby the Forwarding Tables would include QoS class in the first column (besides destination address). So, high priority voice traffic (represented by the route Rt5) is routed via Router R2 which is connected using higher quality MPLS network to the PSTN network. The rest of the traffic (represented by the route Rt6) from Terminal T6 goes to the Internet via Router R3. Here all nodes including Gateway G2 (a core networking node) have a Forwarding Table with appropriate QoS class based next hops, which enable correct routing of different traffic classes.

Figure 6D:
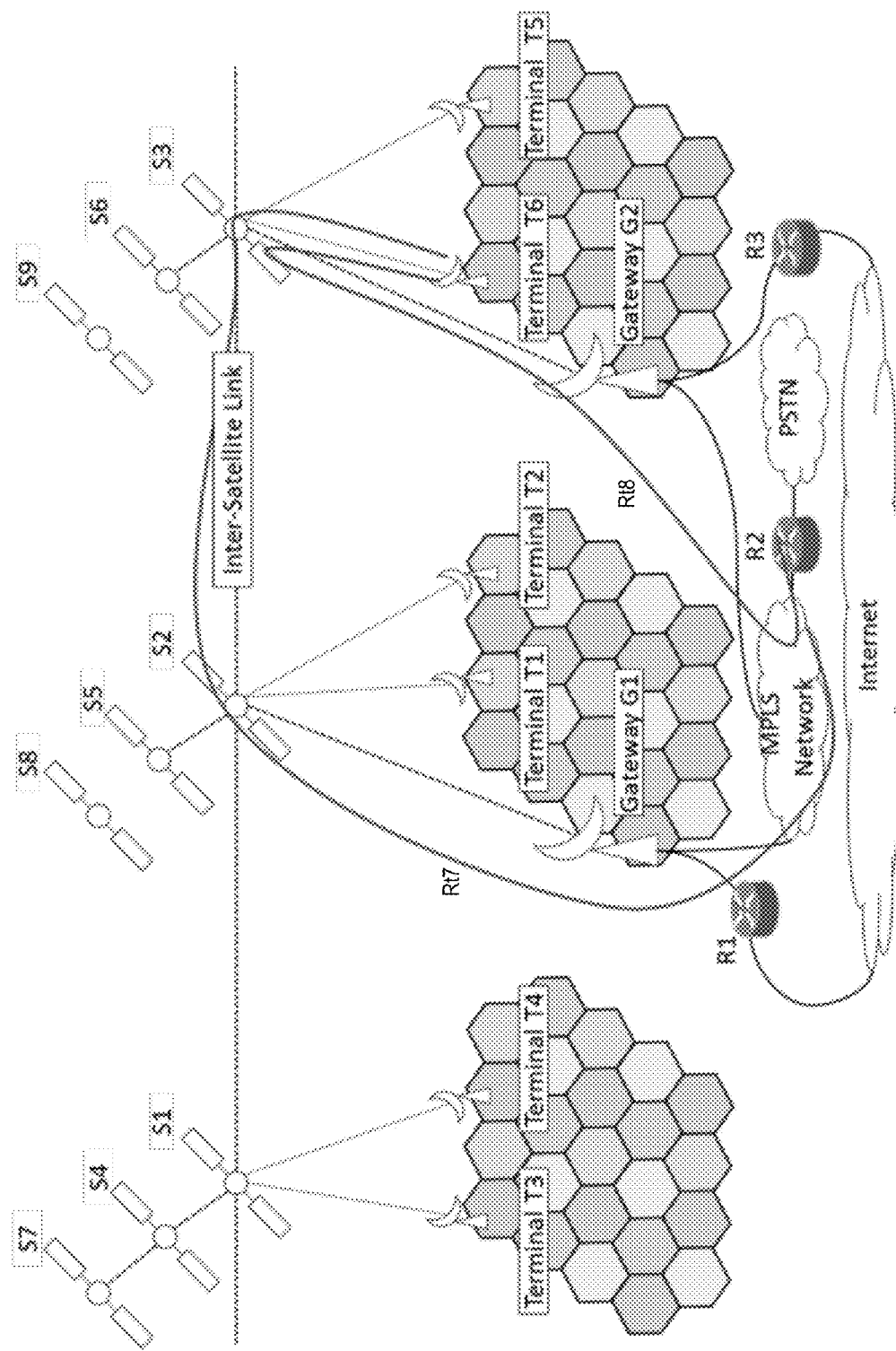
FIG. 6D illustrates a diagram depicting a multi-path route (e.g., resulting from a route determination based on the destination address of user data packets and link capacity information), in accordance with example embodiments of the present invention.

FIG. 6D illustrates a diagram depicting a multi-path route (e.g., resulting from a route determination based on the destination address of user data packets and link capacity information), in accordance with example embodiments of the present invention. With reference to FIG. 6D, different types of traffic from the same terminal T6 is routed to the same destination (Router R2) (represented by the routes Rt7 and Rt8). Similar to the QoS aware routing case, traffic is differentiated at each node with the QoS class marking in the data packet header. The Forwarding Table includes both destination address and QoS class information in the first column which is consulted to find the next hop in each node.

Figure 6E:
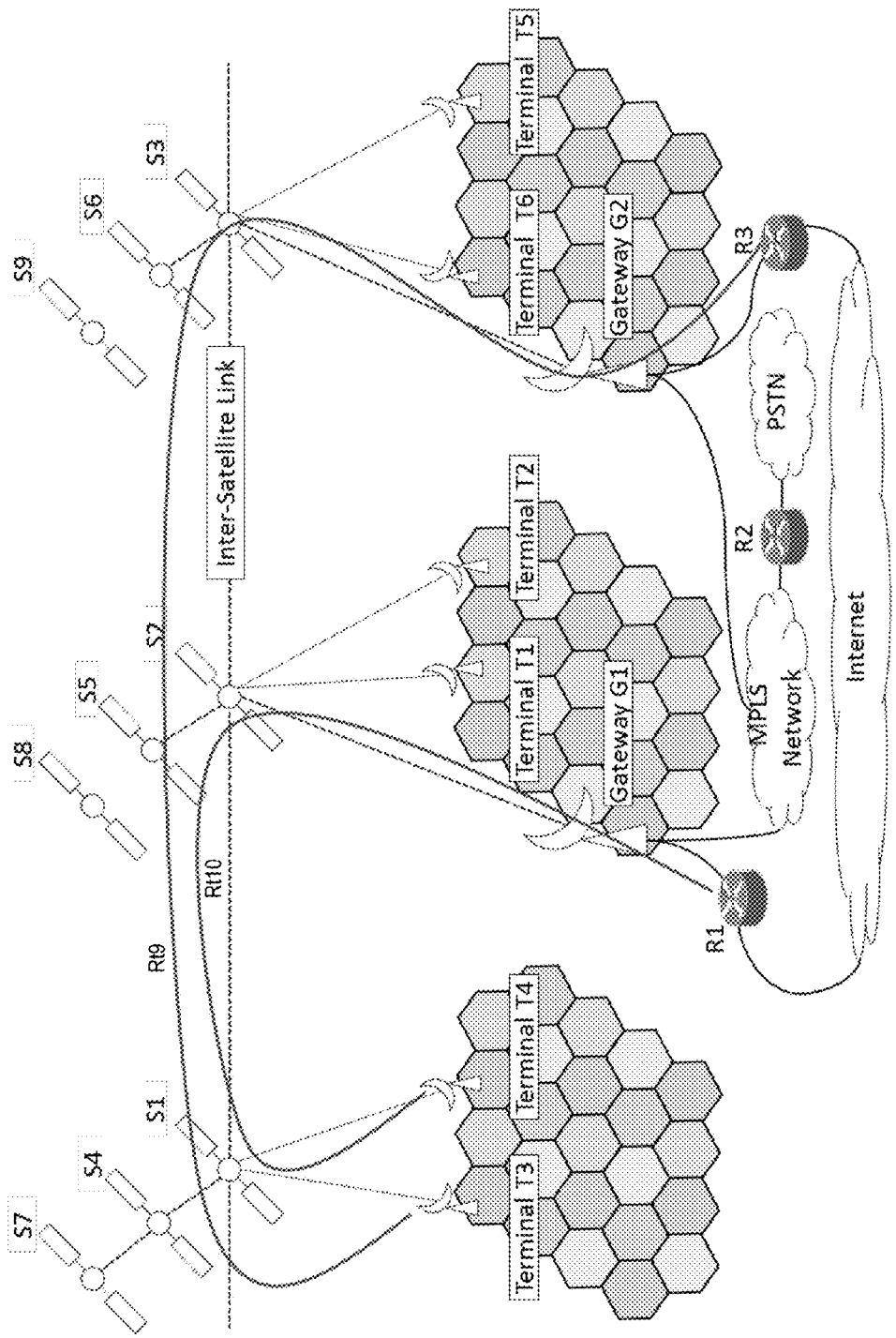
FIG. 6E illustrates a diagram depicting a load distribution route (e.g., resulting from a route determination based on the source and destination addresses of user data packets.

FIG. 6E illustrates a diagram depicting a load distribution route (e.g., resulting from a route determination based on the source and destination addresses of user data packets and link capacity information), in accordance with example embodiments of the present invention. With reference to FIG. 6E, traffic from two different sources but the same destination (here the Internet) is routed over different paths. Terminal T3's traffic is routed via Gateway G2 (represented by the route Rt9) while terminal T4's traffic is routed via Gateway G1 (represented by the route Rt10). All nodes in the respective paths (satellites S1, S2, and S3) have appropriate entries in their Forwarding Tables so that the correct next hop is determined for a data packet. In this case destination address and source address of the data packet header are used to find the appropriate next hop. These additional information items for the Forwarding Table are added with RDF while determining routes and realizing that a specific link cannot carry all traffic and the overall load has to be distributed. Additional information (source address) needs to be provided so that networking nodes can differentiate traffic from terminal T1 and terminal T2.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
periodically receiving, by a central system controller of a wireless communications network, link status information from each of a plurality network nodes of the wireless communications network, wherein the link status information from each of the network nodes reflects current conditions regarding each of one or more currently available communications links between the network node and one or more respective other of the plurality of network nodes, and wherein one or more of the network nodes consist of airborne wireless data communications platforms;

periodically receiving, by the central system controller, network routing constraints from one or more network operations centers of the wireless communications network, wherein the network routing constraints reflect routing requirements applicable to one or more subsets of data traffic carried over the wireless communications network;

periodically receiving, by the central system controller, resource allocation information from one or more of the one or more network operations centers, wherein the resource allocation information reflects bandwidth allocations of one or more of the communications links;

periodically determining, by the central system controller, a current constellation topology reflecting current positions of the one or more network nodes that consist of airborne wireless data communications platforms;

periodically determining, by the central system controller, updates for one or more of a plurality of network path routes, wherein each network path route consists of a data communications path between a respective pair of endpoints of the wireless communications network, and each path route includes one or more of the communications links and one or more of the network nodes, and wherein each path route update is determined based at least in part on one or more of the periodically received link status information regarding the respective links of the path route, the periodically received network routing constraints, periodically received resource allocation information regarding one or more of the respective links of the path route, and the periodically determined current constellation topology; and generating an updated forwarding table for each of the network nodes, wherein each forwarding table includes a plurality of route entries, wherein each route entry specifies a next hop network node to which each network node of a respective path route is to route respective data packets traveling over that path route, and wherein the updated forwarding table is generated based on updates to the network path routes, and wherein the updates for the one or more of the plurality of network path routes are determined at times based on respective changes in the one or more of the periodically received link status information regarding the respective links of the path route, the periodically received network routing constraints, the periodically received resource allocation information regarding one or more of the respective links of the path route, and the periodically determined current constellation topology, and the path routes are thereby dynamically updated in real-time based on changing conditions of the communications links.

2. The method according to claim 1, wherein the current conditions regarding each of one or more communications links between the network node and one or more respective other of the plurality of network nodes includes one or more of operational status of the link and data traffic conditions of the link.

3. The method according to claim 1, wherein the constellation topology is based at least in part on one or more of ephemeris data received from one or more of the airborne wireless data communications platforms, predetermined flight patterns of one or more of the airborne wireless data communications platforms, and the link status information received from one or more of the airborne wireless data communications platforms.

4. The method according to claim 1, wherein the one or more currently available communications links include one or more communications links between respective pairs of the airborne wireless data communications platforms.

5. The method according to claim 1, wherein one or more of the airborne wireless data communications platforms consist of data communications satellites.

6. The method according to claim 1, wherein each of the plurality of route entries of the forwarding table for a one of the network nodes provides the next network node hop for a respective data packet type designated at least by a traffic type or quality of service (QoS) requirement, a source address and a destination address.

7. The method according to claim 6, wherein the source address and destination address specify a respective one of the network path routes for the data packet type, and the updates for the respective path route for the data packet type are determined to satisfy the QoS for the data traffic type.

8. The method according to claim 6, wherein the source address indicates a respective customer site and terminal from where the respective data packet type originated and the destination address indicates a destination terminal to where the respective data packet type is being transmitted, and wherein the source address and destination address specify a respective one of the network path routes for the data packet type, and the updates for the respective path route for the data packet type are determined to satisfy one or more service level agreements (SLAs) associated with the customer and required for the data packet type.

9. A system controller of a wireless communications network, comprising:

at least one wired network interface, each configured to periodically receive link status information from each of a plurality of respective terrestrial network nodes of the wireless communications network;

at least one wireless network interface, each configured to periodically receive link status information from each of a plurality of respective airborne wireless data communications nodes of the wireless communications network; and at least one processor; and wherein the plurality of terrestrial network nodes and the plurality of airborne wireless data communications nodes collectively make up a plurality of network nodes, and the link status information from each of the network nodes reflects current conditions regarding each of one or more currently available communications links between the network node and one or more respective other of the plurality of network nodes, wherein the at least one wired network interface and the at least one wireless network interface collectively make up a plurality of network interfaces, and one or more of the plurality of network interfaces is configured to periodically receive network routing constraints from one or more network operations centers of the wireless communications network, wherein the network routing constraints reflect routing requirements applicable to one or more subsets of data traffic carried over the wireless communications network, wherein one or more of the plurality of network interfaces is configured to periodically receive resource allocation information from one or more of the one or more network operations centers, wherein the resource allocation information reflects bandwidth allocations of one or more of the communications links, wherein at least one of the at least one processor is configured to periodically determine a current constellation topology reflecting current positions of the airborne wireless data communications nodes, wherein at least one of the at least one processor is configured to periodically determine updates for one or more of a plurality of network path routes, wherein each network path route consists of a data communications path between a respective pair of endpoints of the wireless communications network, and each path route includes one or more of the communications links and one or more of the network nodes, and wherein each path route update is determined based at least in part on one or more of the periodically received link status information regarding the respective links of the path route, the periodically received network routing constraints, periodically received resource allocation information regarding one or more of the respective links of the path route, and the periodically determined current constellation topology, wherein at least one of the at least one processor is configured to generate an updated forwarding table for each of the network nodes, wherein each forwarding table includes a plurality of route entries, wherein each route entry specifies a next hop network node to which each network node of a respective path route is to route respective data packets traveling over that path route, and wherein the updated forwarding table is generated based on updates to the network path routes, and wherein the updates for the one or more of the plurality of network path routes are determined at times based on respective changes in the one or more of the periodically received link status information regarding the respective links of the path route, the periodically received network routing constraints, the periodically received resource allocation information regarding one or more of the respective links of the path route, and the periodically determined current constellation topology, and the path routes are thereby dynamically updated in real-time based on changing conditions of the communications links.

10. The system controller according to claim 9, wherein the current conditions regarding each of one or more communications links between the network node and one or more respective other of the plurality of network nodes includes one or more of operational status of the link and data traffic conditions of the link.

11. The system controller according to claim 9, wherein the constellation topology is based at least in part on one or more of ephemeris data received from one or more of the airborne wireless data communications platforms, predetermined flight patterns of one or more of the airborne wireless data communications platforms, and the link status information received from one or more of the airborne wireless data communications platforms.

12. The system controller according to claim 9, wherein the one or more currently available communications links include one or more communications links between respective pairs of the airborne wireless data communications platforms.

13. The system controller according to claim 9, wherein one or more of the airborne wireless data communications nodes consist of data communications satellites.

14. The system controller according to claim 9, wherein each of the plurality of route entries of the forwarding table for a one of the network nodes provides the next network node hop for a respective data packet type designated at least by a traffic type or quality of service (QoS) requirement, a source address and a destination address.

15. The system controller according to claim 14, wherein the source address and destination address specify a respective one of the network path routes for the data packet type, and the updates for the respective path route for the data packet type are determined to satisfy the QoS for the data traffic type.

16. The system controller according to claim 14, wherein the source address indicates a respective customer site and terminal from where the respective data packet type originated and the destination address indicates a destination terminal to where the respective data packet type is being transmitted, and wherein the source address and destination address specify a respective one of the network path routes for the data packet type, and the updates for the respective path route for the data packet type are determined to satisfy one or more service level agreements (SLAs) associated with the customer and required for the data packet type.

* * * * *